(12) United States Patent
Tani

(10) Patent No.: US 8,270,740 B2
(45) Date of Patent: Sep. 18, 2012

(54) FREQUENCY CONVERTER AND FREQUENCY INVERTER

(75) Inventor: Yujiro Tani, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 1017 days.

(21) Appl. No.: 12/245,986

(22) Filed: Oct. 6, 2008

(65) Prior Publication Data

US 2009/0103821 A1    Apr. 23, 2009

(30) Foreign Application Priority Data

Oct. 18, 2007  (JP) ................. 2007-270960

(51) Int. Cl.
*G06K 9/36* (2006.01)
*G06K 9/46* (2006.01)
(52) U.S. Cl. .................. 382/240; 382/233; 382/248
(58) Field of Classification Search .................. 382/233, 382/240, 248, 302
See application file for complete search history.

(56) References Cited

U.S. PATENT DOCUMENTS

| | | | |
|---|---|---|---|
| 4,754,492 A * | 6/1988 | Malvar .................. | 382/268 |
| 6,101,279 A * | 8/2000 | Nguyen et al. ................. | 382/240 |
| 6,771,828 B1 * | 8/2004 | Malvar .................. | 382/240 |
| 2006/0133684 A1 | 6/2006 | Srinivasan et al. | |

FOREIGN PATENT DOCUMENTS

| JP | 5-83142 | 4/1993 |
|---|---|---|
| JP | 2006-197573 | 7/2006 |

OTHER PUBLICATIONS

"HD Photo-Photographic Still Image File Format" pp. 1-5, 1-66, 2006.

* cited by examiner

*Primary Examiner* — Phuoc Tran
(74) *Attorney, Agent, or Firm* — Oblon, Spivak, McClelland, Maier & Neustadt, L.L.P.

(57) ABSTRACT

On the first hierarchical layer, the input image adjuster selects an overlap processing area from a frequency-unconverted image. On the first hierarchical layer, the overlap processor performs overlap processing on the overlap processing area, and holds the image data of the remaining processing areas, which cannot be frequency-converted. The remaining processing area, which is a linear area, can have an image width reduced down to the displacement between the overlap processing area and the block areas. The processes on the second hierarchical layer are identical to those on the first hierarchical layer. As a result, the encoder maximizes the advantage of the high performance achieved by hardware implementation.

17 Claims, 24 Drawing Sheets

FIRST INPUT
(FIRST HIERARCHICAL LAYER)

SECOND INPUT
(FIRST HIERARCHICAL LAYER)

THIRD INPUT
(FIRST HIERARCHICAL LAYER)

FOURTH INPUT
(FIRST HIERARCHICAL LAYER)

FIFTH INPUT
(FIRST HIERARCHICAL LAYER)

SIXTH INPUT
(FIRST HIERARCHICAL LAYER)

SEVENTH INPUT
(FIRST HIERARCHICAL LAYER)

EIGHTH INPUT
(FIRST HIERARCHICAL LAYER)

NINTH INPUT
(FIRST HIERARCHICAL LAYER)

FIG. 3

| INPUT ON THE FIRST HIERARCHICAL LAYER | OUTPUT ON THE FIRST HIERARCHICAL LAYER | THE NUMBER OF PIXELS TO BE STORED ON THE FIRST HIERARCHICAL LAYER |
|---|---|---|
| FIRST | | $2 \times 2$ |
| SECOND | | $18 \times 2$ |
| ⋮ | | ⋮ |
| N-TH | | $(16N-14) \times 2$ |
| (N + 1)TH | | $16(N+1) \times 2$ |
| (N + 2)TH | ⟶ FIRST | $16(N+1) \times 2$ |
| (N + 3)TH | ⟶ SECOND | $16(N+1) \times 2$ |
| ⋮ | ⋮ | ⋮ |

FIRST INPUT
(FIRST HIERARCHICAL LAYER)

SECOND INPUT
(FIRST HIERARCHICAL LAYER)

THIRD INPUT
(FIRST HIERARCHICAL LAYER)

FOURTH INPUT
(FIRST HIERARCHICAL LAYER)

FIFTH INPUT
(FIRST HIERARCHICAL LAYER)

SIXTH INPUT
(FIRST HIERARCHICAL LAYER)

THE REMAINING OVERLAP
INVERSE PROCESSING
(FIRST HIERARCHICAL LAYER)

FIG. 6

| INPUT ON THE FIRST HIERARCHICAL LAYER | OUTPUT ON THE FIRST HIERARCHICAL LAYER | THE NUMBER OF PIXELS TO BE STORED ON THE FIRST HIERARCHICAL LAYER |
|---|---|---|
| FIRST → | FIRST | 30 × 2 |
| SECOND → | SECOND | 46 × 2 |
| ⋮ | ⋮ | ⋮ |
| N-TH → | N-TH | (16N+14) × 2 |
| (N + 1)TH → | (N + 1)TH | 16(N+1) × 2 |
| (N + 2)TH → | (N + 2)TH | 16(N+1) × 2 |
| (N + 3)TH → | (N + 3)TH | 16(N+1) × 2 |
| ⋮ | ⋮ | ⋮ |

FIRST INPUT
(FIRST HIERARCHICAL LAYER)

SECOND INPUT
(FIRST HIERARCHICAL LAYER)

THIRD INPUT
(FIRST HIERARCHICAL LAYER)

(D) FOURTH INPUT
(FIRST HIERARCHICAL LAYER)

FIFTH INPUT
(FIRST HIERARCHICAL LAYER)

SIXTH INPUT
(FIRST HIERARCHICAL LAYER)

SEVENTH INPUT
(FIRST HIERARCHICAL LAYER)

EIGHTH INPUT
(FIRST HIERARCHICAL LAYER)

(I) NINTH INPUT
(FIRST HIERARCHICAL LAYER)

FIRST INPUT
(SECOND HIERARCHICAL LAYER)

SECOND INPUT
(SECOND HIERARCHICAL LAYER)

THIRD INPUT
(SECOND HIERARCHICAL LAYER)

FOURTH INPUT
(SECOND HIERARCHICAL LAYER)

FIFTH INPUT
(SECOND HIERARCHICAL LAYER)

SIXTH INPUT
(SECOND HIERARCHICAL LAYER)

SEVENTH INPUT
(SECOND HIERARCHICAL LAYER)

EIGHTH INPUT
(SECOND HIERARCHICAL LAYER)

NINTH INPUT
(SECOND HIERARCHICAL LAYER)

FIRST INPUT
(SECOND HIERARCHICAL LAYER)

SECOND INPUT
(SECOND HIERARCHICAL LAYER)

THIRD INPUT
(SECOND HIERARCHICAL LAYER)

FOURTH INPUT
(SECOND HIERARCHICAL LAYER)

FIFTH INPUT
(SECOND HIERARCHICAL LAYER)

SIXTH INPUT
(SECOND HIERARCHICAL LAYER)

THE REMAINING OVERLAP
INVERSE PROCESSING
(SECOND HIERARCHICAL LAYER)

FIRST INPUT
(FIRST HIERARCHICAL LAYER)

SECOND INPUT
(FIRST HIERARCHICAL LAYER)

THIRD INPUT
(FIRST HIERARCHICAL LAYER)

FOURTH INPUT
(FIRST HIERARCHICAL LAYER)

FIFTH INPUT
(FIRST HIERARCHICAL LAYER)

SIXTH INPUT
(FIRST HIERARCHICAL LAYER)

SEVENTH INPUT
(FIRST HIERARCHICAL LAYER)

EIGHTH INPUT
(FIRST HIERARCHICAL LAYER)

NINTH INPUT
(FIRST HIERARCHICAL LAYER)

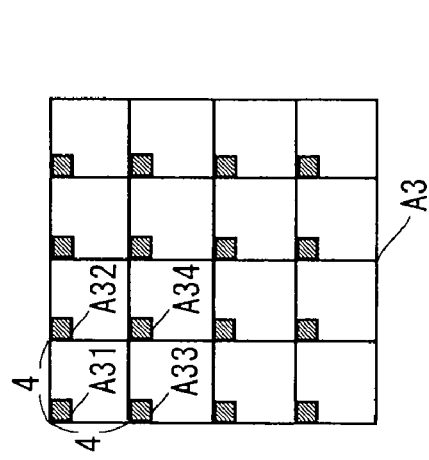
FIG. 14A
INPUT IMAGE
(FIRST HIERARCHICAL LAYER)
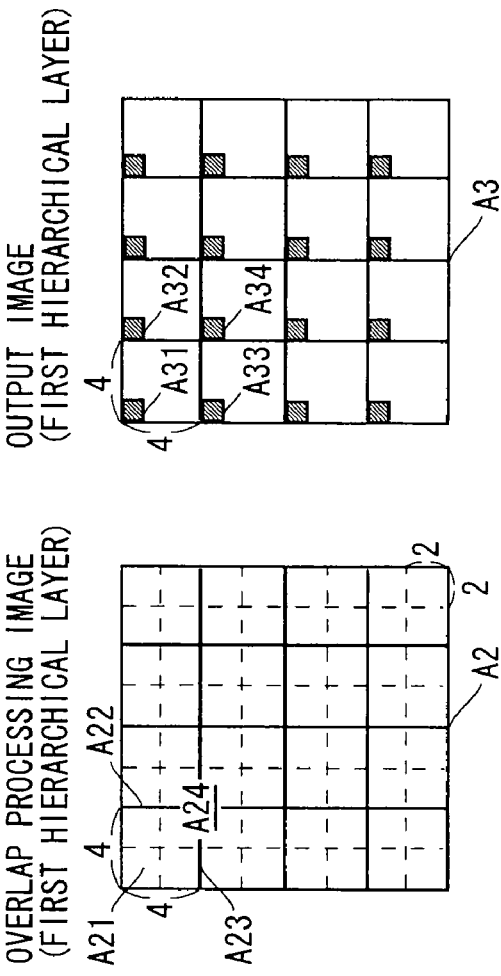
FIG. 14B
OVERLAP PROCESSING IMAGE
(FIRST HIERARCHICAL LAYER)
FIG. 14C
OUTPUT IMAGE
(FIRST HIERARCHICAL LAYER)
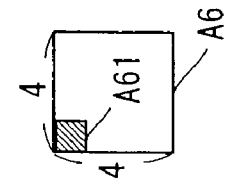
FIG. 14D
INPUT IMAGE
(SECOND HIERARCHICAL LAYER)
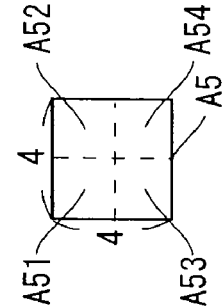
FIG. 14E
OVERLAP PROCESSING IMAGE
(SECOND HIERARCHICAL LAYER)
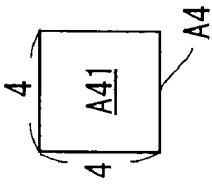
FIG. 14F
OUTPUT IMAGE
(SECOND HIERARCHICAL LAYER)

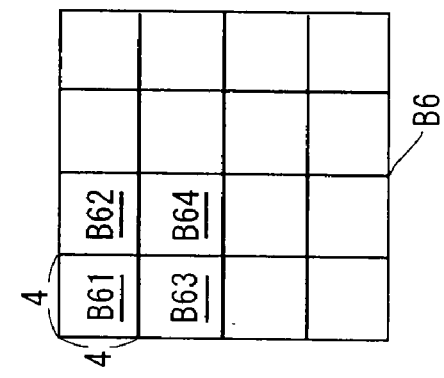
FIG. 16A
INPUT IMAGE
(SECOND HIERARCHICAL LAYER)
FIG. 16B
OVERLAP INVERSE PROCESSING IMAGE
(SECOND HIERARCHICAL LAYER)
FIG. 16C
OUTPUT IMAGE
(SECOND HIERARCHICAL LAYER)
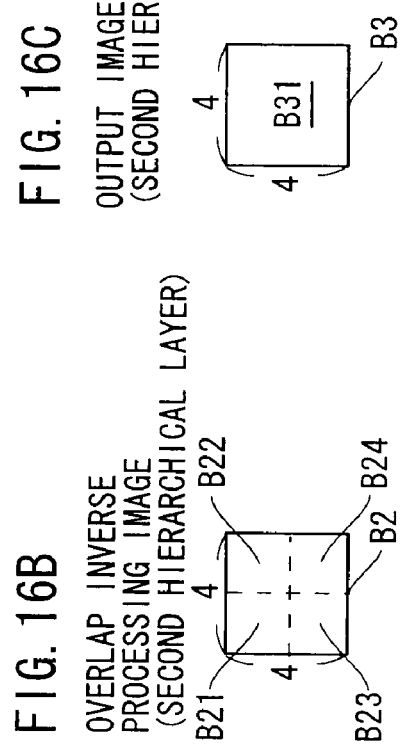
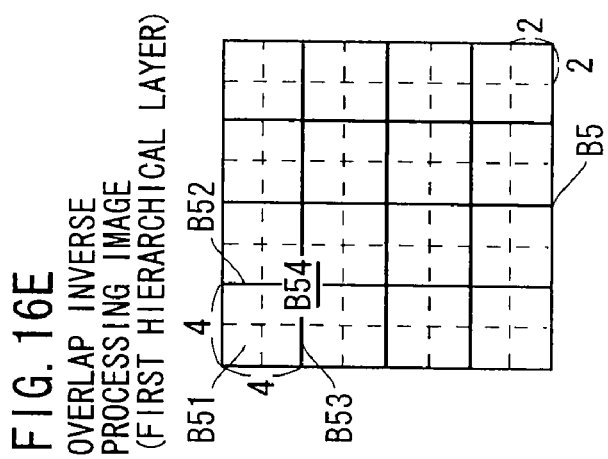
FIG. 16D
INPUT IMAGE
(FIRST HIERARCHICAL LAYER)
FIG. 16E
OVERLAP INVERSE PROCESSING IMAGE
(FIRST HIERARCHICAL LAYER)
FIG. 16F
OUTPUT IMAGE
(FIRST HIERARCHICAL LAYER)
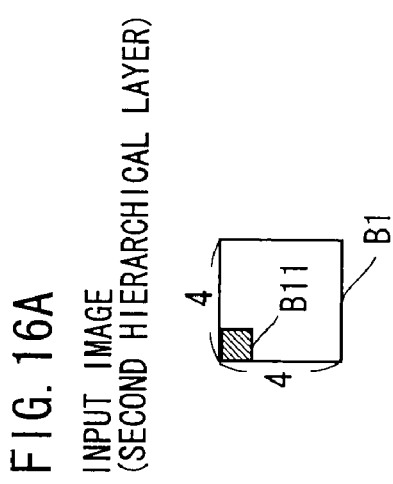
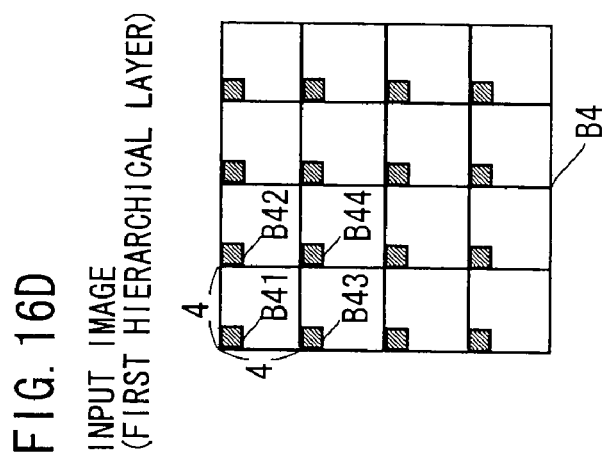

FIRST INPUT
(FIRST HIERARCHICAL LAYER)

SECOND INPUT
(FIRST HIERARCHICAL LAYER)

THIRD INPUT
(FIRST HIERARCHICAL LAYER)

FOURTH INPUT
(FIRST HIERARCHICAL LAYER)

FIFTH INPUT
(FIRST HIERARCHICAL LAYER)

SIXTH INPUT
(FIRST HIERARCHICAL LAYER)

FIG. 18

| INPUT ON THE FIRST HIERARCHICAL LAYER | OUTPUT ON THE FIRST HIERARCHICAL LAYER | THE NUMBER OF PIXELS TO BE STORED ON THE FIRST HIERARCHICAL LAYER |
|---|---|---|
| FIRST | | 16 × 16 |
| SECOND | | 32 × 16 |
| ⋮ | | ⋮ |
| N-TH | | 16N × 16 |
| (N + 1) TH | | 16 (N+1) × 16 |
| (N + 2) TH | ⟶ FIRST | 16 (N+1) × 16 |
| (N + 3) TH | ⟶ SECOND | 16 (N+1) × 16 |
| ⋮ | ⋮ | ⋮ |

FREQUENCY CONVERTER AND FREQUENCY INVERTER

BACKGROUND OF THE INVENTION

1. Field of the Invention

The present invention relates to an encoder and a decoder capable of eliminating block distortion of an image.

2. Description of the Background Art

An encoder for compressing an original image and a decoder for expanding the compressed image reduce the data amount of images to be transmitted in a communications system. One such conventional encoder and decoder is disclosed in "HD Photo-Photographic Still Image File Format", [online], Nov. 7, 2006, Microsoft Corporation, [retrieved on Oct. 10, 2007]. Retrieved from the Internet: <URL:http://www.microsoft.com/whdc/xps/hdphotodpk.mspx>

{The Encoder According to the Background Art}

The encoder disclosed in "HD Photo-Photographic Still Image File Format" is described as follows with reference to FIGS. 13 and 14. The encoder 1P includes a first hierarchical layer 11P, a second hierarchical layer 12P, and a compressor 13P. The first hierarchical layer 11P includes an overlap processor 111P and a frequency conversion section 112P. The second hierarchical layer 12P includes an overlap processor 121P and a frequency conversion section 122P.

On the first hierarchical layer 11P, an original image is inputted from outside the encoder 1P, and then frequency-converted by the frequency conversion section 112P. Then, the DC components of the first hierarchical layer 11P are outputted to the second hierarchical layer 12P and the AC components of the first hierarchical layer 11P are outputted to the compressor 13P.

On the second hierarchical layer 12P, the DC components on the first hierarchical layer 11P are inputted therefrom, and then frequency-converted by the frequency conversion section 122P. The DC and AC components on the second hierarchical layer 12P are outputted to the compressor 13P.

The compressor 13P inputs the AC components on the first hierarchical layer 11P therefrom and the DC and AC components on the second hierarchical layer 12P therefrom. The compressor 13P then compresses data of each component and outputs a compressed image outside the encoder 1P. Thus, the encoder 1P provides efficient data compression.

On the first hierarchical layer 11P, the overlap processor 111P performs overlap processing before the frequency conversion section 112P performs frequency conversion. On the second hierarchical layer 12P, the overlap processor 121P performs overlap processing before the frequency conversion section 122P performs frequency conversion. The overlap processing is performed across four adjacent block areas. As a result, block distortion of an image is eliminated.

Actually, the user can configure the overlap processor 111P or 121P not to operate. For example, the user can configure that the overlap processor 111P on the first hierarchical layer 11P operates, but the overlap processor 121P on the second hierarchical layer 12P does not.

The following is a description of the hierarchical processing by the encoder 1P when the encoder 1P inputs an original image shown in FIG. 14A. An input image A1 on the first hierarchical layer 1P has 16 block areas of 4×4, including block areas A11, A12, A13, and A14. In the following description, a P×Q block area has P pixels in the horizontal direction and Q pixels in the vertical direction.

In an overlap processing image A2 on the first hierarchical layer 11P shown in FIG. 14B, overlap processing is performed across four adjacent block areas, as shown by dotted lines. For example, a 4×4 overlap processing area A24 equally straddles block areas A11, A12, A13, and A14.

At the boundaries of the overlap processing image A2 on the first hierarchical layer 11P, an overlap processing area of 4×4 is not secured, but overlap processing areas of 2×2, 4×2, and 2×4 are secured. For example, overlap processing areas A21 of 2×2, A22 of 4×2, and A23 of 2×4 are secured.

An output image A3 on the first hierarchical layer 11P shown in FIG. 14C has 16 DC components including DC components A31, A32, A33, and A34, and also AC components.

An input image A4 on the second hierarchical layer 12P shown in FIG. 14D has a 4×4 block area A41. The block area A41 has the 16 DC components of the output image A3 on the first hierarchical layer 11P.

In an overlap processing image A5 on the second hierarchical layer 12P shown in FIG. 14E, overlap processing areas A51, A52, A53, and A54 of 2×2 shown by dotted lines are secured.

An output image A6 on the second hierarchical layer 12P shown in FIG. 14F has a DC component A61 and AC components.

{The Decoder According to the Background Art}

The decoder disclosed in "HD Photo-Photographic Still Image File Format" is described as follows with reference to FIGS. 15 and 16. The decoder 2P includes an expander 21P, a second hierarchical layer 22P, and a first hierarchical layer 23P. The second hierarchical layer 22P includes a frequency inversion section 221P and an overlap inverse processor 222P. The first hierarchical layer 23P includes a frequency inversion section 231P and an overlap inverse processor 232P.

The expander 21P inputs a compressed image from outside the decoder 2P and expands data of each component. The expander 21P then outputs the DC and AC components on the second hierarchical layer 22P thereto and further outputs the AC components on the first hierarchical layer 23P thereto.

On the second hierarchical layer 22P, the DC and AC components on its own hierarchical layer are inputted from the expander 21P and then frequency-inverted by the frequency inversion section 221P. The DC components on the first hierarchical layer 23P are outputted thereto from the second hierarchical layer 22P.

On the first hierarchical layer 23P, the DC components on their own hierarchical layer are inputted from the second hierarchical layer 22P and the AC components on their own hierarchical layer are inputted from the expander 21P, and then frequency-inverted by the frequency inversion section 231P. Then, an expanded image is outputted from the first hierarchical layer 23P outside the decoder 2P. Thus, the decoder 2P provides efficient data expansion.

On the second hierarchical layer 22P, the overlap inverse processor 222P performs overlap inverse processing after the frequency inversion section 221P performs frequency inversion. On the first hierarchical layer 23P, the overlap inverse processor 232P performs overlap inverse processing after the frequency inversion section 231P performs frequency inversion. The overlap inverse processing is performed across four adjacent block areas. As a result, block distortion of an image is eliminated.

Actually, the user can configure the overlap inverse processor 222P or 232P not to operate. For example, the user can configure that the overlap inverse processor 232P on the first hierarchical layer 23P operates, but the overlap inverse processor 222P on the second hierarchical layer 22P does not.

The following is a description of the hierarchical processing by the decoder 2P when the decoder 2P outputs an expanded image shown in FIG. 16F. An input image B1 on the second hierarchical layer 22P shown in FIG. 16A has a DC component B11 and AC components.

In an overlap inverse processing image B2 on the second hierarchical layer 22P shown in FIG. 16B, overlap inverse processing areas B21, B22, B23, and B24 of 2×2 shown by dotted lines are secured.

An output image B3 on the second hierarchical layer 22P shown in FIG. 16C has a 4×4 block area B31. The block area B31 has the 16 DC components of the input image B4 on the first hierarchical layer 23P.

An input image B4 on the first hierarchical layer 23P shown in FIG. 16D has 16 DC components including DC components B41, B42, B43, and B44 and also AC components.

In an overlap inverse processing image B5 on the first hierarchical layer 23P shown in FIG. 16E, overlap inverse processing is performed across four adjacent block areas, as shown by dotted lines. For example, a 4×4 overlap inverse processing area B54 equally straddles block areas B61, B62, B63, and B64.

At the boundaries of the overlap inverse processing image B5 on the first hierarchical layer 23P, an overlap inverse processing area of 4×4 is not secured, but overlap inverse processing areas of 2×2, 4×2, and 2×4 are secured. For example, overlap inverse processing areas B51 of 2×2, B52 of 4×2, and B53 of 2×4 are secured.

An output image B6 on the first hierarchical layer 23P has 16 block areas of 4×4 including the block areas B61, B62, B63, and B64.

{The Problems of the Encoder to be Solved}

The following is a description of the problems of the encoder 1P to be solved. The frequency conversion section 112P cannot complete frequency conversion of the overlap processing image A2 on the first hierarchical layer 11P, until the overlap processor 111P completes overlap processing on the input image A1 on the first hierarchical layer 11P. The frequency conversion section 122P cannot complete frequency conversion of the overlap processing image A5 on the second hierarchical layer 12P, until the overlap processor 121P completes overlap processing on the input image A4 on the second hierarchical layer 12P.

The original image that the encoder 1P actually inputs generally has a large number of 16×16 image areas. The overlap processor 111P is required to hold the data of a 16×16 image area out of the original image until the image area undergoes the overlap processing. The overlap processor 121P has the same problem. This lowers the performance of the encoder 1P, thus reducing the advantage of the high performance to be achieved by hardware implementation.

The following is a description, with reference to FIGS. 17A to 17F and 18, of how much data the overlap processor 111P is required to hold. In FIGS. 17A to 17F and 18, for simplification, the following description assumes a case where the higher, first hierarchical layer 11P performs overlap processing, but the lower, second hierarchical layer 12P does not. Since block distortion appears along block boundaries, this assumption is practical. The following description also assumes that the encoder 1P inputs a 32×48 original image which has two 16×16 image areas in the horizontal direction and three 16×16 image areas in the vertical direction.

As shown in FIG. 17A, the overlap processor 111P inputs the first 16×16 image area and performs overlap processing on a 14×14 image area C11, but not on the remaining image area C12. The overlap processor 111P performs overlap processing on the last image area after inputting image areas adjacent thereto.

As shown in FIG. 17B, the overlap processor 111P inputs the second 16×16 image area and performs overlap processing on a 2×14 image area C121 of the image area C12, and a 16×14 image area C21, but not on a 16×2 image area C122 of the image area C12, and a 16×2 image area C22. The overlap processor 111P performs overlap processing on the last two image areas after inputting image areas adjacent thereto.

As shown in FIG. 17C, the overlap processor 111P inputs the third 16×16 image area and performs overlap processing on a 14×2 image area C1221 of the image area C122, and a 14×14 image area C31, but not on a 2×2 image area C1222 of the image area C122, the image area C22, and the remaining image area C32. The overlap processor 111P performs overlap processing on the last three image areas after inputting image areas adjacent thereto.

As shown in FIG. 17D, the overlap processor 111P inputs the fourth 16×16 image area and performs overlap processing on the image area C1222, the image area C22, a 2×14 image area C321 of the image area C32, and a 16×14 image area C41, but not on a 16×2 image area C322 of the image area C32, and a 16×2 image area C42. The overlap processor 111P performs overlap processing on the last two image areas after inputting image areas adjacent thereto.

Thus completing the overlap processing on the first and second inputted 16×16 image areas, the overlap processor 111P does not need to hold the data of these image areas any more. The frequency conversion section 112P performs frequency conversion on these image areas.

As shown in FIG. 17E, the overlap processor 111P inputs the fifth 16×16 image area and performs overlap processing on a 14×2 image area C3221 of the image area C322, and a 14×16 image area C51, but not on a 2×2 image area C3222 of the image area C322, the image area C42, and a 2×16 image area C52. The overlap processor 111P performs overlap processing on the last three image areas after inputting an image area adjacent thereto.

As shown in FIG. 17F, the overlap processor 111P inputs the sixth 16×16 image area and performs overlap processing on the image areas C3222, C42, C52, and a 16×16 image area C6.

Thus completing the overlap processing on the third to sixth inputted 16×16 image areas, the overlap processor 111P does not need to hold the data of these image areas any more. The frequency conversion section 112P performs frequency conversion on these image areas.

The following description assumes a general case where the original image includes N image areas of 16×16 in the horizontal direction. After the first to N-th inputs, the overlap processor 111P has not completed overlap processing on the 16×16 image areas inputted so far.

Therefore, as shown in FIG. 18, the overlap processor 111P is required to hold 16×16 image data after the first input, 32×16 image data after the second input, and 16N×16 image data after the N-th input.

After the (N+1)th input, the overlap processor 111P has not completed overlap processing on the 16×16 image areas inputted so far. After the (N+2)th input, however, the overlap processor 111P completes overlap processing on the first inputted 16×16 image area. Similarly, after the (N+3)th input, the overlap processor 111P completes overlap processing on the second inputted 16×16 image area.

Therefore, as shown in FIG. 18, the overlap processor 111P is required to hold up to 16(N+1)×16 image data. More specifically, the overlap processor 111P needs to hold image data of approximately up to the product of (the vertical width of the input unit area)×(the horizontal width of the original image). The term "input unit area" means a 16×16 image area that the encoder 1P inputs at one time.

{The Problems of the Decoder to be Solved}

The following is a description of the problems of the decoder 2P to be solved. The frequency inversion section 231P cannot perform frequency inversion of the input image B4 on the first hierarchical layer 23P, until the overlap inverse processor 222P completes overlap inverse processing on the overlap inverse processing image B2 on the second hierarchical layer 22P. The decoder 2P cannot output the output image B6 on the first hierarchical layer 23P, until the overlap inverse processor 232P completes overlap inverse processing on the overlap inverse processing image B5 on the first hierarchical layer 23P.

The expanded image that the decoder 2P actually outputs generally has a large number of 16×16 image areas. The overlap inverse processor 232P is required to hold the data of a 16×16 image area out of the expanded image until the image area undergoes the overlap inverse processing. The overlap inverse processor 222P has the same problem. This lowers the performance of the decoder 2P, thus reducing the advantage of the high performance to be achieved by hardware implementation.

The following is a description, with reference to FIGS. 17A to 17F and 18, of how much data the overlap inverse processor 232P is required to hold. In FIGS. 17A to 17F and 18, for simplification, the following description assumes a case where the higher, first hierarchical layer 23P performs overlap inverse processing, but the lower, second hierarchical layer 22P does not. Since block distortion appears along block boundaries, this assumption is practical. The following description also assumes that the decoder 2P outputs a 32×48 expanded image which has two 16×16 image areas in the horizontal direction and three 16×16 image areas in the vertical direction.

As shown in FIG. 17A, the overlap inverse processor 232P inputs the first 16×16 image area and performs overlap inverse processing on a 14×14 image area C11, but not on the remaining image area C12. The overlap inverse processor 232P performs overlap inverse processing on the last image area after inputting image areas adjacent thereto.

As shown in FIG. 17B, the overlap inverse processor 232P inputs the second 16×16 image area and performs overlap inverse processing on a 2×14 image area C121 of the image area C12, and a 16×14 image area C21, but not on a 16×2 image area C122 of the image area C12, and a 16×2 image area C22. The overlap inverse processor 232P performs overlap inverse processing on the last two image areas after inputting image areas adjacent thereto.

As shown in FIG. 17C, the overlap inverse processor 232P inputs the third 16×16 image area and performs overlap inverse processing on a 14×2 image area C1221 of the image area C122, and a 14×14 image area C31, but not on a 2×2 image area C1222 of the image area C122, the image area C22, and the remaining image area C32. The overlap inverse processor 232P performs overlap inverse processing on the last three image areas after inputting image areas adjacent thereto.

As shown in FIG. 17D, the overlap inverse processor 232P inputs the fourth 16×16 image area and performs overlap inverse processing on the image area C1222, the image area C22, and a 2×14 image area C321 of the image area C32, and a 16×14 image area C41, but not on a 16×2 image area C322 of the image area C32, and a 16×2 image area C42. The overlap inverse processor 232P performs overlap inverse processing on the last two image areas after inputting image areas adjacent thereto.

Thus completing the overlap inverse processing on the first and second inputted 16×16 image areas, the overlap inverse processor 232P does not need to hold the data of these image areas any more. The decoder 2P outputs the expanded image of these image areas.

As shown in FIG. 17E, the overlap inverse processor 232P inputs the fifth 16×16 image area and performs overlap inverse processing on a 14×2 image area C3221 of the image area C322, and a 14×16 image area C51, but not on a 2×2 image area C3222 of the image area C322, the image area C42, and a 2×16 image area C52. The overlap inverse processor 232P performs overlap inverse processing on the last three image areas after inputting an image area adjacent thereto.

As shown in FIG. 17F, the overlap inverse processor 232P inputs the sixth 16×16 image area and performs overlap inverse processing on the image area C3222, C42, C52, and a 16×16 image area C6.

Thus completing the overlap inverse processing on the third to sixth inputted 16×16 image areas, the overlap inverse processor 232P does not need to hold the data of these image areas any more. The decoder 2P outputs the expanded image of these image areas.

The following description assumes a general case where the expanded image includes N image areas of 16×16 in the horizontal direction. After the first to N-th inputs, the overlap inverse processor 232P has not completed overlap inverse processing on the 16×16 image areas inputted so far.

Therefore, as shown in FIG. 18, the overlap inverse processor 232P is required to hold 16×16 image data after the first input, 32×16 image data after the second input, and 16N×16 image data after the N-th input.

After the (N+1)th input, the overlap inverse processor 232P has not completed overlap inverse processing on the 16×16 image areas inputted so far. After the (N+2)th input, however, the overlap inverse processor 232P completes overlap inverse processing on the first inputted 16×16 image area. Similarly, after the (N+3)th input, the overlap inverse processor 232P completes overlap inverse processing on the second inputted 16×16 image area.

Therefore, as shown in FIG. 18, the overlap inverse processor 232P is required to hold up to 16(N+1)×16 image data. More specifically, the overlap inverse processor 232P needs to hold image data of approximately up to the product of (the vertical width of the output unit area)×(the horizontal width of the expanded image). The term "output unit area" means a 16×16 image area that the decoder 2P outputs at one time.

SUMMARY OF THE INVENTION

The present invention is directed to provide a frequency converter for inputting a frequency-unconverted image and outputting a frequency-converted image, and a frequency inverter for inputting a frequency-uninverted image and outputting a frequency-inverted image.

The frequency converter of the present invention includes: an input image adjuster for inputting an input unit area of the frequency converter from outside the frequency converter; an overlap processor for performing overlap processing on the frequency-unconverted image at the boundary of a frequency converting unit area; and a frequency conversion section for performing frequency conversion on the frequency-unconverted image subjected to overlap processing, wherein: the input image adjuster includes: a processing area selecting element for selecting an overlap processing area from the input unit area, the overlap processor includes: an element for performing overlap processing on the overlap processing area; and an element for holding the image data of the remaining processing area which has been subjected to overlap processing but cannot be frequency-converted, and the remaining processing area includes: a linear area having a predetermined width, the linear area being frequency-converted when overlap processing is performed at the next or subsequent time.

According to the frequency converter of the present invention, the overlap processor is only required to hold the image data of a linear image area having a width corresponding to the displacement between the overlap processing unit area and the frequency converting unit area. As a result, the frequency converter according to the present invention and a hierarchical encoder including a plurality of hierarchical frequency converters according to the present invention maximizes the advantage of the high performance achieved by hardware implementation.

The frequency inverter of the present invention includes: a frequency inversion section for performing frequency inversion on the frequency-uninverted image; an overlap inverse processor for performing overlap inverse processing on the frequency-inverted image at the boundary of a frequency inverting unit area; and an output image adjuster for outputting an output unit area of the frequency inverter outside the frequency inverter, wherein: the overlap inverse processor includes: an inverse processing area selecting element for selecting an overlap inverse processing area capable of being subjected to overlap inverse processing and being fitted into the output unit area; an element for performing overlap inverse processing on the overlap inverse processing area; and an element for holding the image data of the remaining inverse processing area other than the overlap inverse processing area, and the output image adjuster includes: an element for fitting the overlap inverse processing area into the output unit area, and the remaining inverse processing area includes: a linear area having a predetermined width, the linear area being subjected to overlap inverse processing at the next or subsequent time.

According to the frequency inverter of the present invention, the overlap inverse processor is only required to hold the image data of a linear image area having a width corresponding to the displacement between the overlap inverse processing unit area and the frequency inverting unit area. As a result, the frequency inverter according to the present invention and a hierarchical decoder including a plurality of hierarchical frequency inverters according to the present invention maximizes the advantage of the high performance achieved by hardware implementation.

Thus, an object of the present invention is to provide a technique to maximize the advantage of the high performance achieved by the hardware implementation of the encoder and the decoder.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows the number of pixels to be stored according to the first embodiment.

FIG. 6 shows the number of pixels to be stored according to the second embodiment.

FIGS. 14A to 14F show the hierarchical structure according to the background art.

FIGS. 16A to 16F show the hierarchical structure according to the background art.

FIG. 18 shows the number of pixels to be stored according to the background art.

DESCRIPTION OF THE PREFERRED EMBODIMENTS

First Embodiment

The Elements of the Encoder

Figure 1:
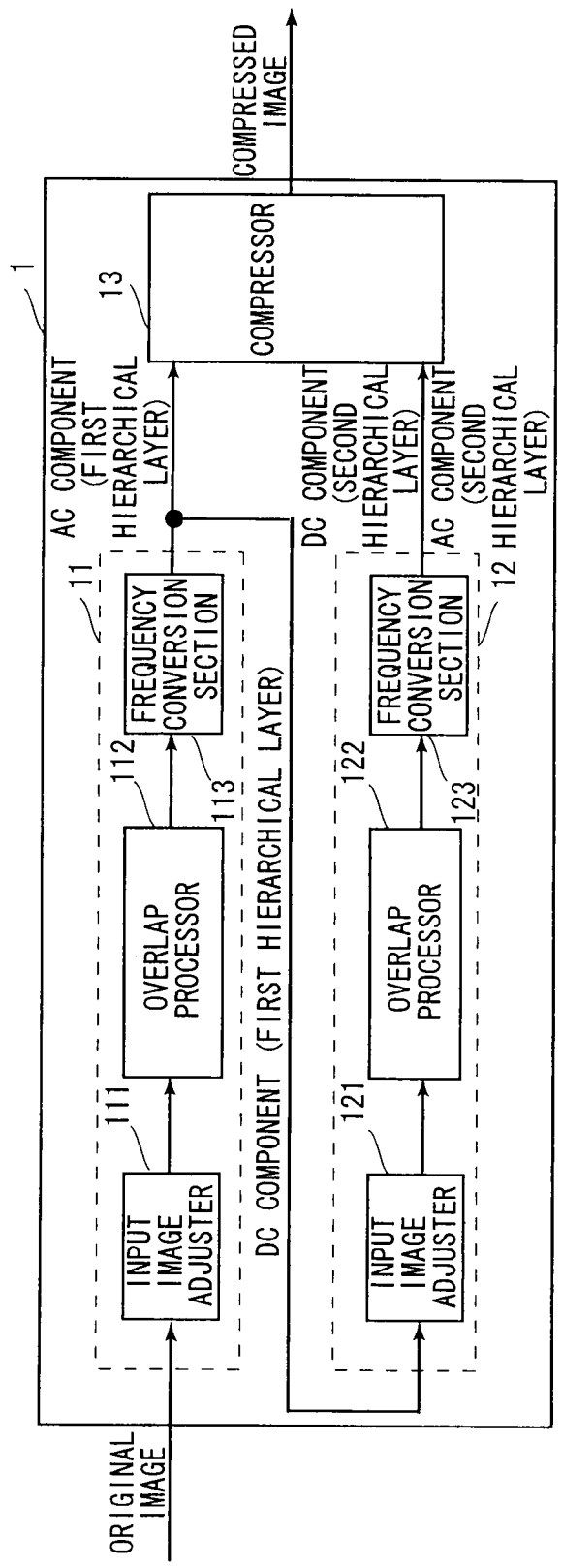
FIG. 1 is a block diagram of the encoder according to the present invention.

The first embodiment is described as follows with reference to the accompanied drawings. FIG. 1 is a block diagram of an encoder 1 according to the first embodiment. The encoder 1 includes a first hierarchical layer 11, a second hierarchical layer 12, and a compressor 13. The first hierarchical layer 11 includes an input image adjuster 111, an overlap processor 112, and a frequency conversion section 113. The second hierarchical layer 12 includes an input image adjuster 121, an overlap processor 122, and a frequency conversion section 123.

On the first hierarchical layer 11, an original image is inputted from outside the encoder 1, and then frequency-converted by the frequency conversion section 113. The DC components of the first hierarchical layer 11 are outputted to the second hierarchical layer 12 and the AC components of the first hierarchical layer 11 are outputted to the compressor 13.

On the first hierarchical layer 11, the original image is inputted in the unit of a 16×16 input unit area as shown in FIG. 14A. The frequency conversion section 113 performs frequency conversion in the unit of a 4×4 block area as shown in FIG. 14C.

On the second hierarchical layer 12, the DC components on the first hierarchical layer 11 are inputted therefrom and then frequency-converted by the frequency conversion section 123. The DC and AC components on the second hierarchical layer 12 are outputted to the compressor 13.

On the second hierarchical layer 12, the DC components on the first hierarchical layer 11 are inputted in the unit of a 4×4 input unit area as shown in FIG. 14D. The frequency conversion section 123 performs frequency conversion in the unit of a 4×4 block area as shown in FIG. 14F.

The compressor 13 inputs the AC components on the first hierarchical layer 11 therefrom and the DC and AC components on the second hierarchical layer 12 therefrom. The compressor 13 then compresses data of each component and outputs a compressed image outside the encoder 1. Thus, the encoder 1 provides efficient data compression.

On the first hierarchical layer 11, the overlap processor 112 performs overlap processing before the frequency conversion section 113 performs frequency conversion. On the second hierarchical layer 12, the overlap processor 122 performs overlap processing before the frequency conversion section 123 performs frequency conversion. As a result, block distortion of an image is eliminated.

The overlap processor 112 performs overlap processing on the 4×4 image area which equally straddles adjacent four block areas of 4×4 as shown in FIG. 14B. In other words, the block area and the overlap processing area are displaced from each other by 2 both in the horizontal and vertical directions. At the boundaries of an input image on the first hierarchical layer 11, overlap processing is performed on the 2×2, 4×2, and 2×4 image areas by the overlap processor 112.

The overlap processor 122 performs overlap processing on the 4×4 image area which equally straddles adjacent four block areas of 4×4 as shown in FIG. 14E. In other words, the block area and the overlap processing area are displaced from each other by 2 both in the horizontal and vertical directions. At the boundaries of an input image on the second hierarchical layer 12, overlap processing is performed on the 2×2, 4×2, and 2×4 image areas by the overlap processor 122.

Actually, the user can configure the overlap processor 112 or 122 not to operate. For example, the user can configure that the overlap processor 112 on the first hierarchical layer 11 operates, but the overlap processor 122 on the second hierarchical layer 12 does not. Since block distortion appears along block boundaries, this assumption is practical.

On the first hierarchical layer 11, the input image adjuster 111 adjusts the input image before the overlap processor 112 performs overlap processing. On the second hierarchical layer 12, the input image adjuster 121 adjusts the input image before the overlap processor 122 performs overlap processing. The adjustment of an input image is described as follows in detail with reference to FIGS. 2A to 2I.

[The Processing Flow of the Encoder]

The following is a description, with reference to FIGS. 2A to 2I, of the processing flow of the encoder 1 according to the first embodiment. In the first embodiment, overlap processing is performed on the first hierarchical layer 11, but not on the second hierarchical layer 12. The encoder 1 inputs a 32×48 original image consisting of two 16×16 image areas in the horizontal direction and three 16×16 image areas in the vertical direction.

Figure 2A:
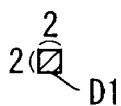
FIGS. 2A to 2I show the encoding process according to the first embodiment.

As shown in FIG. 2A, the input image adjuster 111 adjusts the input image so that only a 2×2 image area D1 is subjected to overlap processing, out of the 16×16 image area to be outputted first to the overlap processor 112. The overlap processor 112 inputs the first 16×16 image area, performs overlap processing on the image area D1, and holds the image data.

Figure 2B:
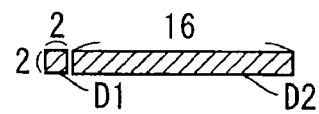

As shown in FIG. 2B, the input image adjuster 111 adjusts the input image so that only a 16×2 image area D2 is subjected to overlap processing, out of the 16×16 image area to be outputted second to the overlap processor 112. The overlap processor 112 inputs the second 16×16 image area, performs overlap processing on the image area D2, and holds the image data.

Figure 2C:
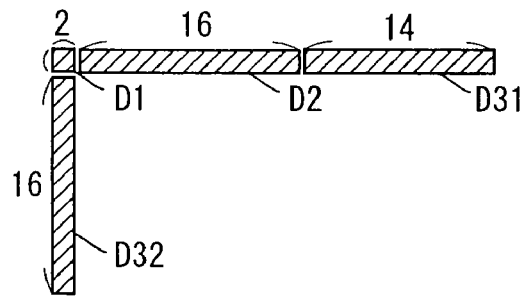

As shown in FIG. 2C, the input image adjuster 111 adjusts the input image so that only a 14×2 image area D31 and a 2×16 image area D32 are subjected to overlap processing, out of the 16×16 image area to be outputted third to the overlap processor 112. The image areas D31 and D32 are fitted into a single 16×16 image area. The overlap processor 112 inputs the third 16×16 image area, performs overlap processing on the image areas D31 and D32, and holds the image data.

Figure 2D:
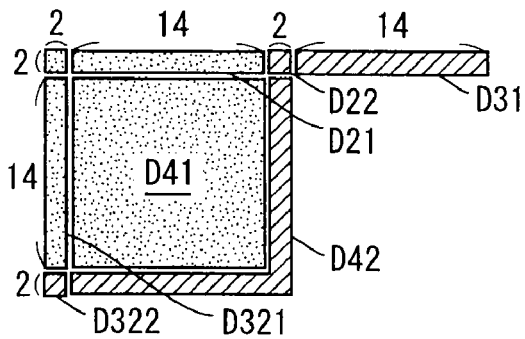

As shown in FIG. 2D, the input image adjuster 111 adjusts the input image so that the whole of the 16×16 image area to be outputted fourth to the overlap processor 112 is subjected to overlap processing. The overlap processor 112 inputs and performs overlap processing on the fourth 16×16 image area. The 16×16 image area has a 14×14 image area D41 and the remaining image area D42.

The image area D1, a 14×2 image area D21 of the image area D2, a 2×14 image area D321 of the image area D32, and the image area D41 together compose the 16×16 image area which has been subjected to overlap processing. The overlap processor 112 outputs the 16×16 image area to the frequency conversion section 113, which performs frequency conversion on the 16×16 image area.

The overlap processor 112 holds the image data of a 2×2 image area D322 of the image area D32, the image area D42, a 2×2 image area D22 of the image area D2, and the image area D31.

Figure 2E:
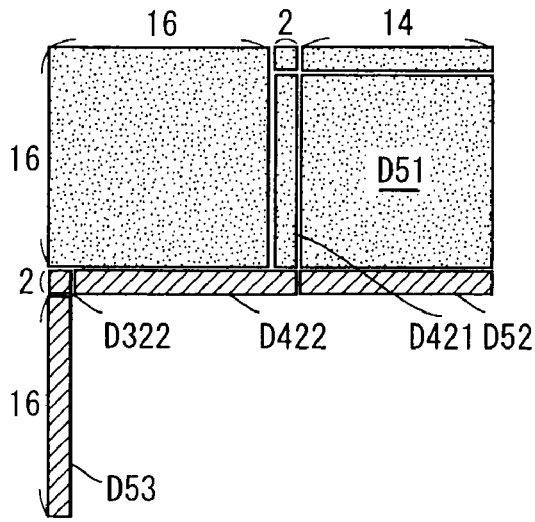

As shown in FIG. 2E, the input image adjuster 111 adjusts the input image so that the whole of the 16×16 image area to be outputted fifth to the overlap processor 112 is subjected to overlap processing. The overlap processor 112 inputs and performs overlap processing on the fifth 16×16 image area. The 16×16 image area has image areas D51 of 14×14, D52 of 14×2, and D53 of 2×16.

The image area D22, the image area D31, a 2×14 image area D421 of the image area D42, and the image area D51 together compose the 16×16 image area which has been subjected to overlap processing. The overlap processor 112 outputs the 16×16 image area to the frequency conversion section 113, which performs frequency conversion on the 16×16 image area.

The overlap processor 112 holds the image data of the image area D53, the image area D322, a 16×2 image area D422 of the image area D42, and the image area D52.

Figure 2F:
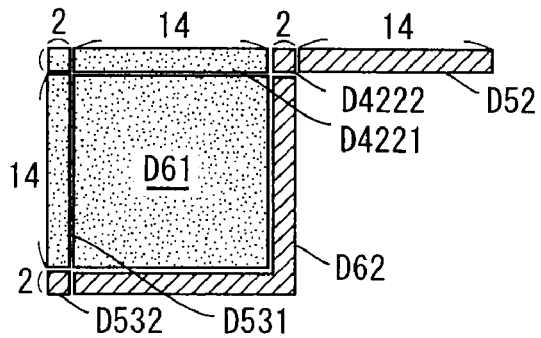

As shown in FIG. 2F, the input image adjuster 111 adjusts the input image so that the whole of the 16×16 image area to be outputted sixth to the overlap processor 112 is subjected to overlap processing. The overlap processor 112 inputs and performs overlap processing on the sixth 16×16 image area. The 16×16 image area has a 14×14 image area D61 and the remaining image area D62.

The image area D322, a 14×2 image area D4221 of the image area D422, a 2×14 image area D531 of the image area D53, and the image area D61 together compose the 16×16 image area which has been subjected to overlap processing. The overlap processor 112 outputs the 16×16 image area to the frequency conversion section 113, which performs frequency conversion on the 16×16 image area.

The overlap processor 112 holds the image data of a 2×2 image area D532 of the image area D53, the image area D62, a 2×2 image area D4222 of the image area D422, and the image area D52.

Figure 2G:
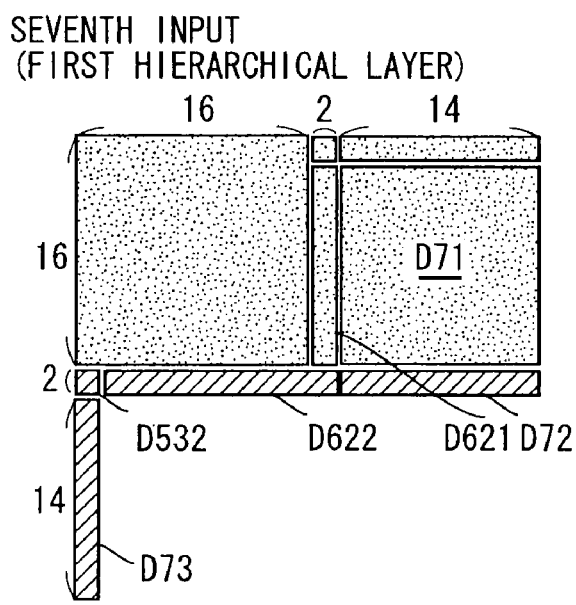

As shown in FIG. 2G, the input image adjuster 111 adjusts the input image so that only a 14×14 image area D71, a 14×2 image area D72, and a 2×14 image area D73 are subjected to overlap processing, out of the 16×16 image area to be outputted seventh to the overlap processor 112. The image areas D71, D72, and D73 are fitted into a single 16×16 image area.

The overlap processor 112 inputs the seventh 16×16 image area and performs overlap processing on the image areas D71, D72, and D73.

The image area D4222, the image area D52, a 2×14 image area D621 of the image area D62, and the image area D71 together compose the 16×16 image area which has been subjected to overlap processing. The overlap processor 112 outputs the 16×16 image area to the frequency conversion section 113, which performs frequency conversion on the 16×16 image area.

The overlap processor 112 holds the image data of the image area D73, the image area D532, a 16×2 image area D622 of the image area D62, and the image area D72.

Figure 2H:
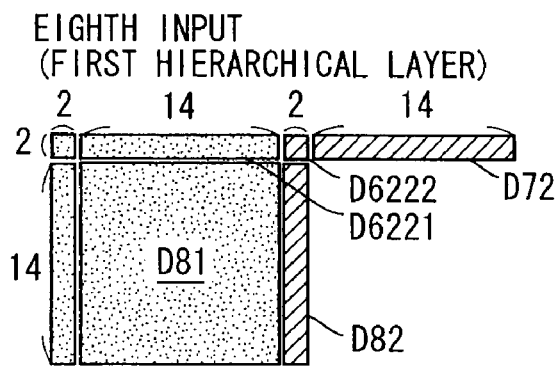

As shown in FIG. 2H, the input image adjuster 111 adjusts the input image so that only a 14×14 image area D81 and a 2×14 image area D82 are subjected to overlap processing, out of the 16×16 image area to be outputted eighth to the overlap processor 112. The image areas D81 and D82 are fitted into a single 16×16 image area. The overlap processor 112 inputs the eighth 16×16 image area and performs overlap processing on the image areas D81 and D82.

The image area D532, a 14×2 image area D6221 of the image area D622, the image area D73 and the image area D81 together compose the 16×16 image area which has been subjected to overlap processing. The overlap processor 112 outputs the 16×16 image area to the frequency conversion section 113, which performs frequency conversion on the 16×16 image area.

The overlap processor 112 holds the image data of the image area D82, a 2×2 image area D6222 of the image area D622, and the image area D72.

Figure 2I:
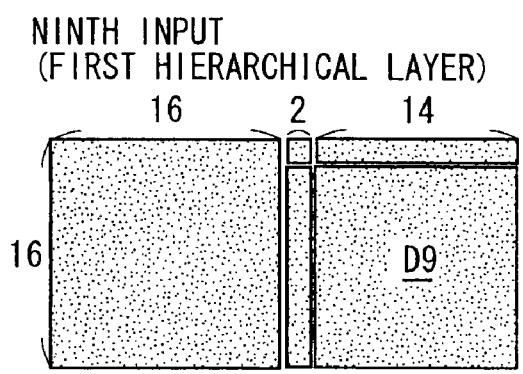

As shown in FIG. 2I, the input image adjuster 111 adjusts the input image so that only a 14×14 image area D9 is subjected to overlap processing, out of the 16×16 image area to be outputted ninth to the overlap processor 112. The overlap processor 112 inputs the ninth 16×16 image area and performs overlap processing on the image area D9.

The image areas D6222, D72, D82, and D9 together compose the 16×16 image area which has been subjected to overlap processing. The overlap processor 112 outputs the 16×16 image area to the frequency conversion section 113, which performs frequency conversion on the 16×16 image area.

When the above-described processing is complete, the processing on the first hierarchical layer 11 is complete. On the second hierarchical layer 12, since the overlap processor 122 does not perform overlap processing, the input image adjuster 121 does not perform the adjustment of an input image. On the second hierarchical layer 12, the frequency conversion section 123 performs frequency conversion on an 8×12 input image.

The following description with reference to FIG. 3 assumes a general case where the original image includes N image areas of 16×16 in the horizontal direction. After the first to N-th inputs, the overlap processor 112 performs overlap processing on image areas having a vertical width of 2. The frequency conversion section 113 cannot perform frequency conversion after the first to N-th inputs. Therefore, the overlap processor 112 is required to hold 2×2 image data after the first input, 18×2 image data after the second input, and (16N−14)×2 image data after the N-th input.

After the (N+1)th input, the overlap processor 112 performs overlap processing on a 14×2 image area and a 2×16 image area. The overlap processor 112 is then required to hold the 16(N+1)×2 image data because the frequency conversion section 113 cannot perform frequency conversion after the (N+1)th input.

After the (N+2)th input, the overlap processor 112 performs overlap processing on the 16×16 image area. The overlap processor 112 is then only required to hold up to 16(N+1)×2 image data because the frequency conversion section 113 can perform frequency conversion after the (N+2)th input and also after the (N+3)th input. More specifically, the overlap processor 112 only needs to hold image data of approximately up to the product of (the vertical displacement between the block area and the overlap processing area)×(the horizontal width of the original image).

After the first to N-th inputs, the overlap processor 112 performs overlap processing only on image areas having a vertical image width of 2. Therefore, the number of the 16×16 image areas that the input image adjuster 111 outputs in the vertical direction is larger by one than the number of the 16×16 image areas that the overlap processor 111P inputs in the vertical direction (see FIGS. 17A to 17F).

However, the maximum image data capacity that the overlap processor 112 is required to hold is ⅛ of the maximum image data capacity that the overlap processor 111P is required to hold (see FIG. 18). As a result, the encoder 1 maximizes the advantage of the high performance achieved by hardware implementation.

The input image adjuster 111 outputs (N+1) image areas of 16×16 in the horizontal direction, thereby outputting an overlap processing area corresponding to the horizontal width of the original image. On the other hand, the overlap processor 111P inputs N image areas of 16×16 in the horizontal direction, thereby inputting an overlap processing area corresponding to the horizontal width of the original image (see FIGS. 17A to 17F).

The input image adjuster 111, however, concurrently outputs the last output in a certain row and the first output in the next row. As a result, the encoder 1 maximizes the advantage of the high performance achieved by hardware implementation.

Second Embodiment

The Elements of the Decoder

Figure 4:
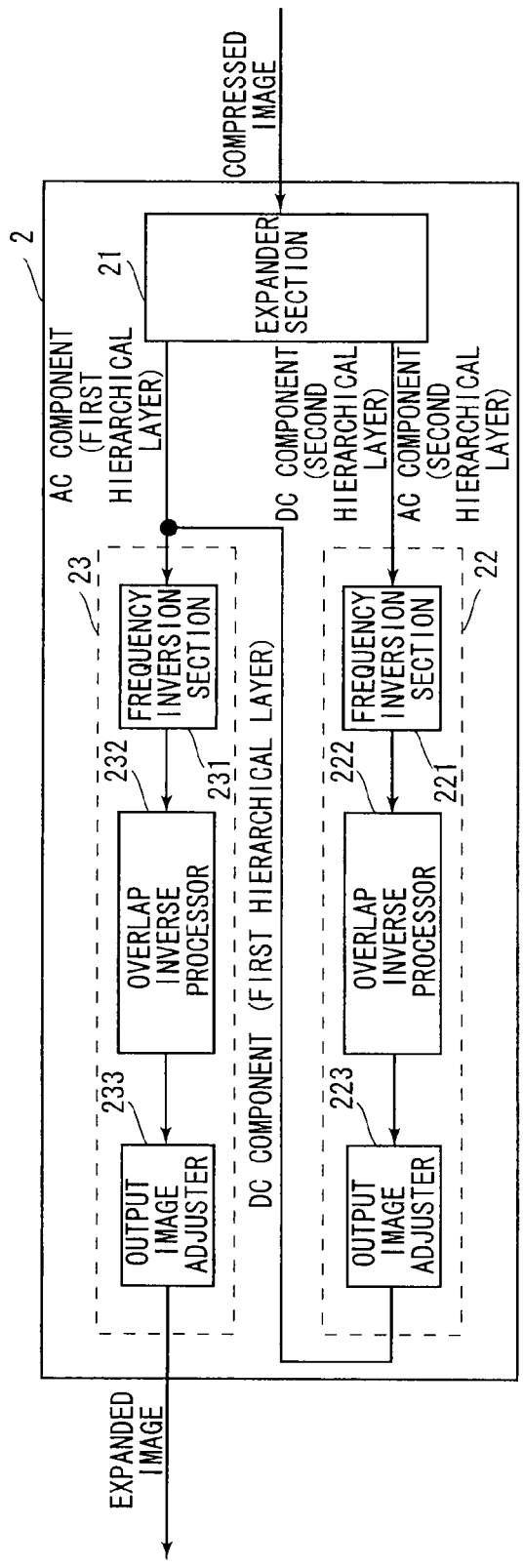
FIG. 4 is a block diagram of the decoder according to the present invention.

The second embodiment is described as follows. FIG. 4 is a block diagram of the decoder 2 according to the second embodiment. The decoder 2 includes an expander 21, a second hierarchical layer 22, and a first hierarchical layer 23. The second hierarchical layer 22 includes a frequency inversion section 221, an overlap inverse processor 222, and an output image adjuster 223. The first hierarchical layer 23 includes a frequency inversion section 231, an overlap inverse processor 232, and an output image adjuster 233.

The expander 21 inputs a compressed image from outside the decoder 2 and expands data of each component. The expander 21 then outputs the DC and AC components on the second hierarchical layer 22 thereto and further outputs the AC components on the first hierarchical layer 23 thereto.

On the second hierarchical layer 22, the DC and AC components on its own hierarchical layer are inputted from the expander 21 and then frequency-inverted by the frequency inversion section 221. The DC components on the first hierarchical layer 23 are outputted thereto from the second hierarchical layer 22.

The frequency inversion section 221 performs frequency inversion in the unit of a 4×4 block area as shown in FIG. 16A. On the second hierarchical layer 22, the DC components on the first hierarchical layer 23 are outputted in the unit of a 4×4 output unit area as shown in FIG. 16C.

On the first hierarchical layer 23, the DC components on their own hierarchical layer are inputted from the second hierarchical layer 22 and the AC components on their own hierarchical layer are inputted from the expander 21. The frequency inversion section 231 performs frequency inversion on these components. The expanded image is outputted from the first hierarchical layer 23 outside the decoder 2. Thus, the decoder 2 provides efficient data expansion.

The frequency inversion section 231 performs frequency inversion in the unit of a 4×4 block area as shown in FIG. 16D. On the first hierarchical layer 23, the expanded image is outputted in the unit of a 16×16 output unit area as shown in FIG. 16F.

On the second hierarchical layer 22, the overlap inverse processor 222 performs overlap inverse processing after the frequency inversion section 221 performs frequency inversion. On the first hierarchical layer 23, the overlap inverse processor 232 performs overlap inverse processing after the frequency inversion section 231 performs frequency inversion. As a result, block distortion of an image is eliminated.

The overlap inverse processor 222 performs overlap inverse processing on the 4×4 image area which equally straddles adjacent four block areas of 4×4 as shown in FIG. 16B. In other words, the block area and the overlap inverse processing area are displaced from each other by 2 both in the horizontal and vertical directions. At the boundaries of an output image on the second hierarchical layer 22, overlap inverse processing is performed on the 2×2, 4>2, and 2×4 image areas by the overlap inverse processor 222.

The overlap inverse processor 232 performs overlap inverse processing on the 4×4 image area which equally straddles adjacent four block areas of 4×4 as shown in FIG. 16E. In other words, the block area and the overlap inverse processing area are displaced from each other by 2 both in the horizontal and vertical directions. At the boundaries of an output image on the first hierarchical layer 23, overlap inverse processing is performed on the 2×2, 4>2, and 2×4 image areas by the overlap inverse processor 232.

Actually, the user can configure the overlap inverse processor 222 or 232 not to operate. For example, the user can configure that the overlap inverse processor 232 on the first hierarchical layer 23 operates, but the overlap inverse processor 222 on the second hierarchical layer 22 does not. Since block distortion appears along block boundaries, this assumption is practical.

On the second hierarchical layer 22, the output image adjuster 223 adjusts an output image after the overlap inverse processor 222 performs overlap inverse processing. On the first hierarchical layer 23, the output image adjuster 233 adjusts an output image after the overlap inverse processor 232 performs overlap inverse processing. The adjustment of an output image is described as follows in detail with reference to FIGS. 5A to 5G.

[The Processing Flow of the Decoder]

The following is a description, with reference to FIGS. 5A to 5G, of the processing flow of the decoder 2 according to the second embodiment. In the second embodiment, overlap inverse processing is performed on the first hierarchical layer 23, but not on the second hierarchical layer 22. The decoder 2 outputs a 32×48 expanded image consisting of two 16×16 image areas in the horizontal direction and three 16×16 image areas in the vertical direction.

On the second hierarchical layer 22, the frequency inversion section 221 performs frequency inversion on an 8×12 input image, but the overlap inverse processor 222 does not perform overlap inverse processing. Therefore, on the second hierarchical layer 22, the output image adjuster 223 does not perform the adjustment of an output image.

Figure 5A:
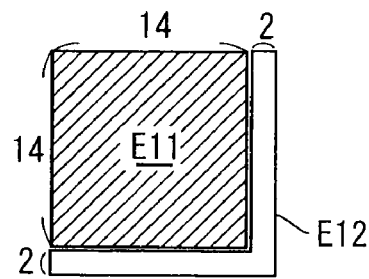
FIGS. 5A to 5G show a decoding process according to the second embodiment.

As shown in FIG. 5A, the overlap inverse processor 232 inputs the first frequency-inverted 16×16 image area from the frequency inversion section 231. The 16×16 image area has a 14×14 image area E11 and the remaining image area E12. The overlap inverse processor 232 performs overlap inverse processing on the image area E11 and outputs it to the output image adjuster 233.

The output image adjuster 233 adjusts the output image so that only the image area E11 composes the expanded image, out of the 16×16 image area to be outputted first outside the decoder 2. The overlap inverse processor 232 does not perform overlap inverse processing on the image area E12 and holds the image data.

Figure 5B:
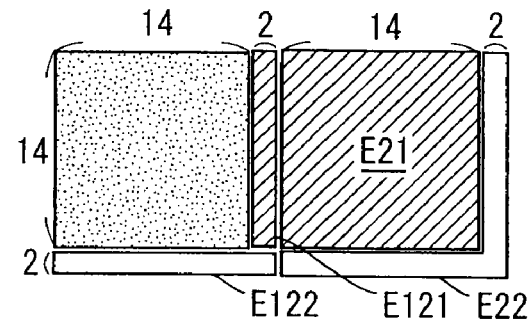

As shown in FIG. 5B, the overlap inverse processor 232 inputs the second frequency-inverted 16×16 image area from the frequency inversion section 231. The 16×16 image area has a 14×14 image area E21 and the remaining image area E22. The overlap inverse processor 232 performs overlap inverse processing on a 2×14 image area E121 of the image area E12, and the image area E21, and outputs them to the output image adjuster 233.

The output image adjuster 233 adjusts the output image so that only the image areas E121 and E21 compose the expanded image, out of the 16×16 image area to be outputted second outside the decoder 2. The image areas E121 and E21 are fitted into a single 16×16 image area. The overlap inverse processor 232 does not perform overlap inverse processing on a 16×2 image area E122 of the image area E12, and the image area E22, and holds the image data.

Figure 5C:
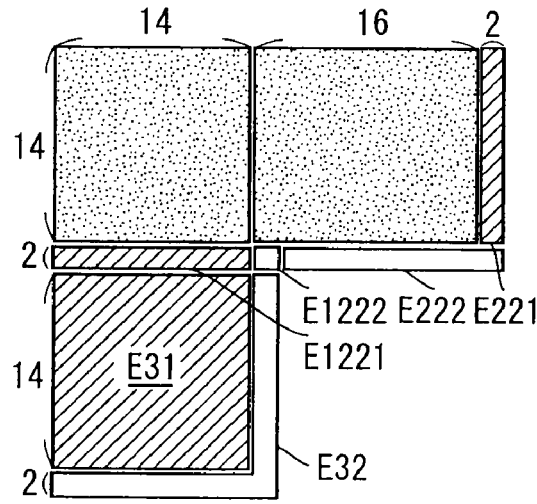

As shown in FIG. 5C, the overlap inverse processor 232 inputs the third frequency-inverted 16×16 image area from the frequency inversion section 231. The 16×16 image area has a 14×14 image area E31 and the remaining image area E32. The overlap inverse processor 232 performs overlap inverse processing on a 2×14 image area E221 of the image area E22, a 14×2 image area E1221 of the image area E122, and the image area E31, and outputs them to the output image adjuster 233.

The output image adjuster 233 adjusts the output image so that only the image areas E221, E1221, and E31 compose the expanded image, out of the 16×16 image area to be outputted third outside the decoder 2. The image areas E221, E1221, and E31 are fitted into a single 16×16 image area. The overlap inverse processor 232 does not perform overlap inverse processing on the image area E32, a 2×2 image area E1222 of the image area E122, and a 16×2 image area E222 of the image area E22, and holds the image data.

Figure 5D:
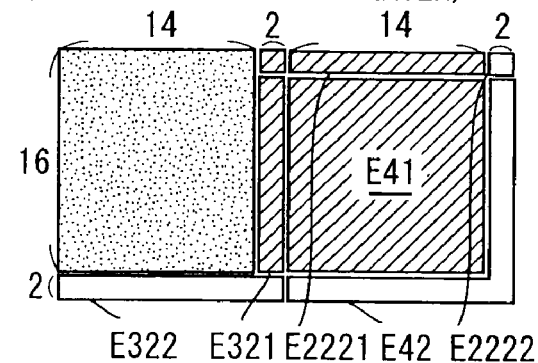

As shown in FIG. 5D, the overlap inverse processor 232 inputs the fourth frequency-inverted 16×16 image area from the frequency inversion section 231. The 16×16 image area has a 14×14 image area E41 and the remaining image area E42. The overlap inverse processor 232 performs overlap inverse processing on the image area E1222, a 14×2 image area E2221 of the image area E222, a 2×14 image area E321 of the image area E32, and the image area E41, and outputs them to the output image adjuster 233.

The output image adjuster 233 adjusts the output image so that the whole of the 16×16 image area to be outputted fourth outside the decoder 2 composes the expanded image. The image areas E1222, E2221, E321, and E41 are fitted into a single 16×16 image area. The overlap inverse processor 232 does not perform overlap inverse processing on a 16×2 image area E322 of the image area E32, the image area E42 and a 2×2 image area E2222 of the image area E222, and holds the image data.

Figure 5E:
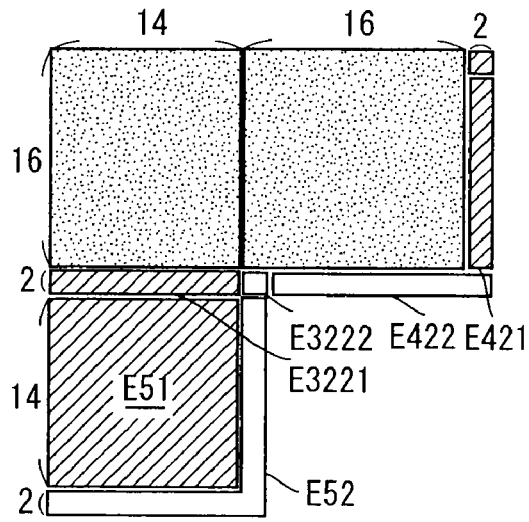

As shown in FIG. 5E, the overlap inverse processor 232 inputs the fifth frequency-inverted 16×16 image area from the frequency inversion section 231. The 16×16 image area has a 14×14 image area E51 and the remaining image area E52. The overlap inverse processor 232 performs overlap inverse processing on the image area E2222, a 2×14 image area E421 of the image area E42, a 14×2 image area E3221 of the image area E322, and the image area E51, and outputs them to the output image adjuster 233.

The output image adjuster 233 adjusts the output image so that the whole of the 16×16 image area to be outputted fifth outside the decoder 2 composes the expanded image. The image areas E2222, E421, E3221, and E51 are fitted into a single 16×16 image area. The overlap inverse processor 232 does not perform overlap inverse processing on the image area E52, a 2×2 image area E3222 of the image area E322, and a 16×2 image area E422 of the image area E42, and holds the image data.

Figure 5F:
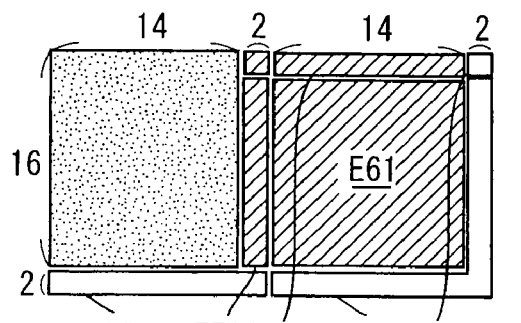

As shown in FIG. 5F, the overlap inverse processor 232 inputs the sixth frequency-inverted 16×16 image area from the frequency inversion section 231. The 16×16 image area has a 14×14 image area E61 and the remaining image area E62. The overlap inverse processor 232 performs overlap inverse processing on the image area E3222, a 14×2 image area E4221 of the image area E422, a 2×14 image area E521 of the image area E52, and the image area E61, and outputs them to the output image adjuster 233.

The output image adjuster 233 adjusts the output image so that the whole of the 16×16 image area to be outputted sixth outside the decoder 2 composes the expanded image. The image areas E3222, E4221, E521, and E61 are fitted into a single 16×16 image area. The overlap inverse processor 232 does not perform overlap inverse processing on a 16×2 image area E522 of the image area E52, the image area E62 and a 2×2 image area E4222 of the image area E422, and holds the image data.

When the above-described processing is complete, the overlap inverse processor 232 completes the input of the frequency-inverted 16×16 image areas from the frequency inversion section 231. The overlap inverse processor 232 continues to perform overlap inverse processing on the image areas corresponding to the held image data.

Figure 5G:
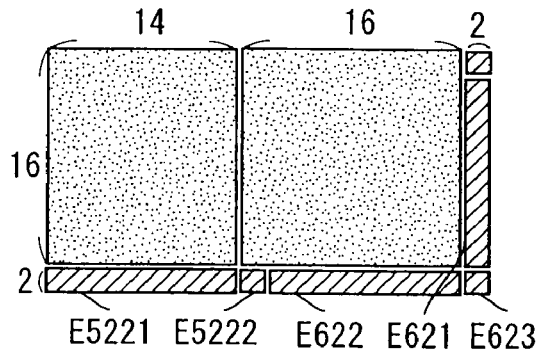

As shown in FIG. 5G, the overlap inverse processor 232 performs overlap inverse processing on the image area E4222, a 2×14 image area E621 of the image area E62, and a 14×2 image area E5221 of the image area E522, and outputs them to the output image adjuster 233.

The output image adjuster 233 adjusts the output image so that only the image areas E4222, E621, and E5221 compose the expanded image, out of the 16×16 image area to be outputted seventh outside the decoder 2. The image areas E4222, E621, and E5221 are fitted into a single 16×16 image area.

As shown in FIG. 5G, the overlap inverse processor 232 performs overlap inverse processing on a 2×2 image area E5222 of the image area E522, and a 14×2 image area E622 of the image area E62, and outputs them to the output image adjuster 233.

The output image adjuster 233 adjusts the output image so that only the image areas E5222 and E622 compose the expanded image, out of the 16×16 image area to be outputted eighth outside the decoder 2. The image areas E5222 and E622 are fitted into a single 16×16 image area.

As shown in FIG. 5G, the overlap inverse processor 232 performs overlap inverse processing on a 2×2 image area E623 of the image area E62, and outputs it to the output image adjuster 233.

The output image adjuster 233 adjusts the output image so that only the image area E623 composes the expanded image, out of the 16×16 image area to be outputted ninth outside the decoder 2.

The following description with reference to FIG. 6 assumes a general case where the expanded image includes N image areas of 16×16 in the horizontal direction. After the first to N-th inputs, the overlap inverse processor 232 cannot perform overlap inverse processing on an image area having a vertical width of 2 at the bottom edge and an image area having a horizontal width of 2 at the right edge, out of the image areas inputted so far. Therefore, the overlap inverse processor 232 is required to hold 30×2 image data after the first input, 46×2 image data after the second input, and (16N+14)×2 image data after the N-th input.

After the (N+1)th input, the overlap inverse processor 232 cannot perform overlap inverse processing on image areas having a vertical width of 2 at the bottom edge, and an image area having a horizontal width of 2 at the right edge and connecting the image areas of the bottom edge, out of the image areas inputted so far. This holds true after the (N+2)th and (N+3)th inputs. Therefore, the overlap inverse processor 232 is only required to hold up to 16(N+1)×2 image data. More specifically, the overlap inverse processor 232 only needs to hold image data of approximately up to the product of (the vertical displacement between the block area and the overlap inverse processing area)×(the horizontal width of the expanded image).

After the final input, the overlap processor 232 performs overlap inverse processing on the image area having a vertical width of 2 at the bottom edge and the image area having a horizontal width of 2 at the right edge, out of the image areas inputted so far. Therefore, the number of the 16×16 image areas that the output image adjuster 233 outputs in the vertical direction is larger by one than the number of the 16×16 image areas that the overlap inverse processor 232P outputs in the vertical direction (see FIGS. 17A to 17F).

However, the maximum image data capacity that the overlap inverse processor 232 is required to hold is ⅛ of the maximum image data capacity that the overlap inverse processor 232P is required to hold (see FIG. 18). As a result, the decoder 2 maximizes the advantage of the high performance achieved by hardware implementation.

The output image adjuster 233 outputs (N+1) image areas of 16×16 in the horizontal direction, thereby outputting an overlap inverse processing area corresponding to the horizontal width of the expanded image. On the other hand, the overlap processor 232P outputs N image areas of 16×16 in the horizontal direction, thereby outputting an overlap inverse processing area corresponding to the horizontal width of the expanded image (see FIGS. 17A to 17F).

The output image adjuster 233, however, concurrently outputs the last output in a certain row and the first output in the next row. As a result, the decoder 2 maximizes the advantage of the high performance achieved by hardware implementation.

Third Embodiment

The following is a description, with reference to FIGS. 7A to 7I and 8, of the processing flow of the encoder 1 according to the third embodiment. The encoder 1 according to the third embodiment is identical to the encoder 1 shown in FIG. 1. Overlap processing is performed on the first and second hierarchical layers 11 and 12 as shown in FIGS. 7A to 7I and 8, respectively. The encoder 1 inputs a 32×48 original image consisting of two 16×16 image areas in the horizontal direction and three 16×16 image areas in the vertical direction.

[The Processing Flow on the First Hierarchical Layer]

Figure 7A:
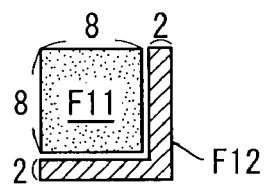
FIGS. 7A to 7I show the encoding process according to the third embodiment.

As shown in FIG. 7A, the input image adjuster 111 adjusts the input image so that only a 10×10 image area out of the 16×16 image area to be outputted first to the overlap processor 112 is subjected to overlap processing. The overlap processor 112 inputs the first 16×16 image area and performs overlap processing on the 10×10 image area. The 10×10 image area has an 8×8 image area F11 and the remaining image area F12. The reason that the input image adjuster 111 adjusts the input image so that only the 10×10 image area is subjected to overlap processing is described as follows with reference to FIG. 8.

The image area F11 composes the 8×8 image area subjected to overlap processing. The overlap processor 112 outputs the 8×8 image area to the frequency conversion section 113, which performs frequency conversion on the 8×8 image area.

The overlap processor 112 holds the image data of the image area F12.

Figure 7B:
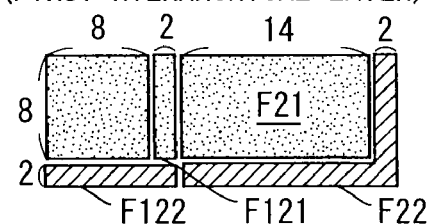

As shown in FIG. 7B, the input image adjuster 111 adjusts the input image so that only a 16×10 image area out of the 16×16 image area to be outputted second to the overlap processor 112 is subjected to overlap processing. The overlap processor 112 inputs the second 16×16 image area and performs overlap processing on the 16×10 image area. The 16×10 image area has a 14×8 image area F21 and the remaining image area F22.

A 2×8 image area F121 of the image area F12, and the image area F21 together compose the 16×8 image area subjected to overlap processing. The overlap processor 112 outputs the 16×8 image area to the frequency conversion section 113, which performs frequency conversion on the 16×8 image area.

The overlap processor 112 holds the image data of a 10×2 image area F122 of the image area F12, and the image area F22.

Figure 7C:
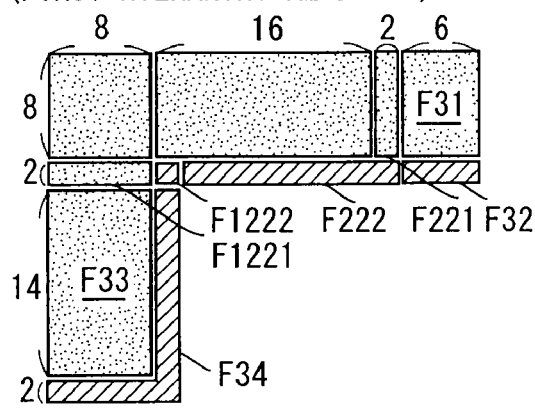

As shown in FIG. 7C, the input image adjuster 111 adjusts the input image so that only a 6×10 image area and a 10×16 image area out of the 16×16 image area to be outputted third to the overlap processor 112 are subjected to overlap processing. The overlap processor 112 inputs the third 16×16 image area and performs overlap processing on the 6×10 and 10×16 image areas. The 6×10 image area has a 6×8 image area F31 and a 6×2 image area F32. The 10×16 image area has an 8×14 image area F33 and the remaining image area F34.

A 2×8 image area F221 of the image area F22, and the image area F31 together compose the 8×8 image area subjected to overlap processing. An 8×2 image area F1221 of the image area F122, and the image area F33 together compose the 8×16 image area subjected to overlap processing. The overlap processor 112 outputs the 8×8 and 8×16 image areas to the frequency conversion section 113, which performs frequency conversion on the 8×8 and 8×16 image areas.

The overlap processor 112 holds the image data of the image area F34, a 2×2 image area F1222 of the image area F122, a 16×2 image area F222 of the image area F22, and the image area F32.

Figure 7D:
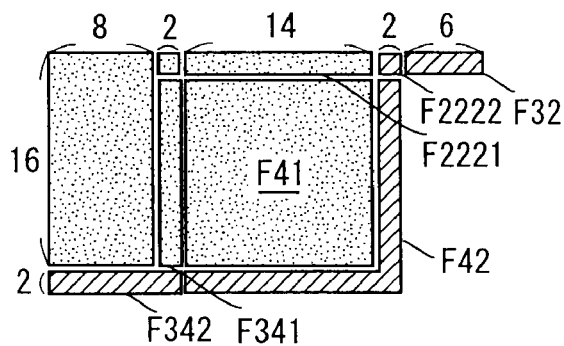

As shown in FIG. 7D, the input image adjuster 111 adjusts the input image so that the whole of the 16×16 image area to be outputted fourth to the overlap processor 112 is subjected to overlap processing. The overlap processor 112 inputs and performs overlap processing on the fourth 16×16 image area. The 16×16 image area has a 14×14 image area F41 and the remaining image area F42.

The image area F1222, a 14×2 image area F2221 of the image area F222, a 2×14 image area F341 of the image area F34, and the image area F41 together compose the 16×16 image area subjected to overlap processing. The overlap processor 112 outputs the 16×16 image area to the frequency conversion section 113, which performs frequency conversion on the 16×16 image area.

The overlap processor 112 holds the image data of a 10×2 image area F342 of the image area F34, the image area F42, a 2×2 image area F2222 of the image area F222, and the image area F32.

Figure 7E:
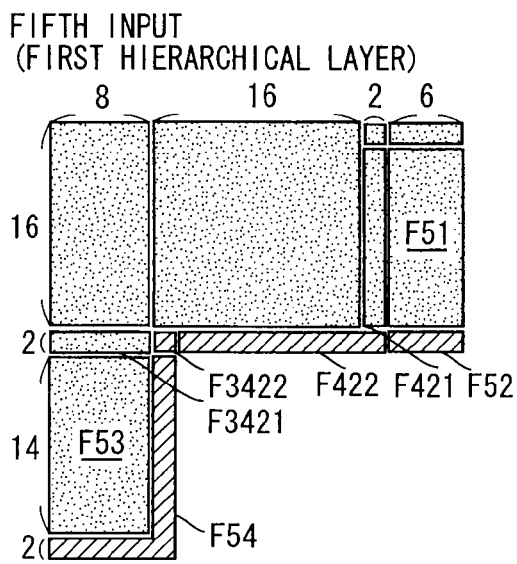

As shown in FIG. 7E, the input image adjuster 111 adjusts the input image so that the whole of the 16×16 image area to be outputted fifth to the overlap processor 112 is subjected to overlap processing. The overlap processor 112 inputs and performs overlap processing on the fifth 16×16 image area. The 16×16 image area has a 6×14 image area F51, a 6×2 image area F52, an 8×14 image area F53, and the remaining image area F54.

The image area F2222, the image area F32, a 2×14 image area F421 of the image area F42, and the image area F51 together compose the 8×16 image area subjected to overlap processing. An 8×2 image area F3421 of the image area F342 and the image area F53 together compose the 8×16 image area subjected to overlap processing. The overlap processor 112 outputs the first and second 8×16 image areas to the frequency conversion section 113, which performs frequency conversion on the first and second 8×16 image areas.

The overlap processor 112 holds the image data of the image area F54, a 2×2 image area F3422 of the image area F342, a 16×2 image area F422 of the image area F42, and the image area F52.

Figure 7F:
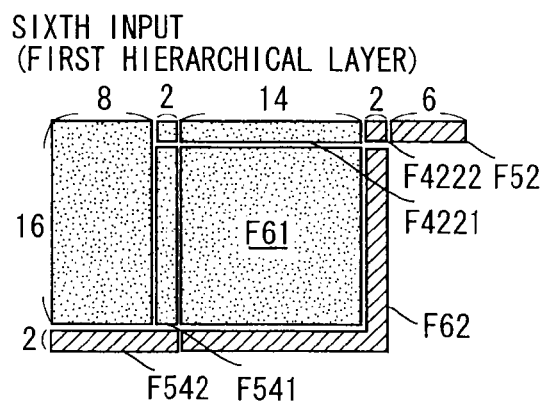

As shown in FIG. 7F, the input image adjuster 111 adjusts the input image so that the whole of the 16×16 image area to be outputted sixth to the overlap processor 112 is subjected to overlap processing. The overlap processor 112 inputs and performs overlap processing on the sixth 16×16 image area. The 16×16 image area has a 14×14 image area F61 and the remaining image area F62.

The image area F3422, a 14×2 image area F4221 of the image area F422, a 2×14 image area F541 of the image area F54, and the image area F61 together compose the 16×16 image area subjected to overlap processing. The overlap processor 112 outputs the 16×16 image area to the frequency conversion section 113, which performs frequency conversion on the 16×16 image area.

The overlap processor 112 holds the image data of a 10×2 image area F542 of the image area F54, the image area F62, a 2×2 image area F4222 of the image area F422, and the image area F52.

Figure 7G:
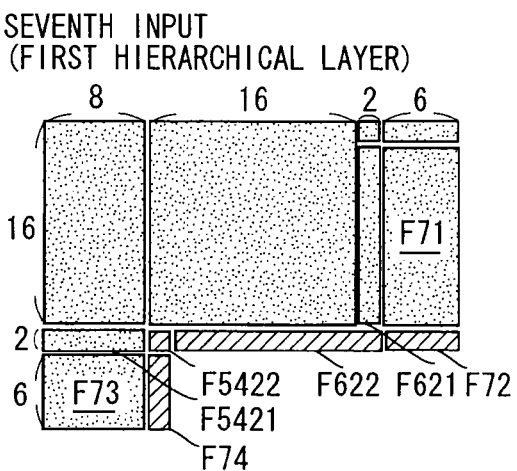

As shown in FIG. 7G, the input image adjuster 111 adjusts the input image so that only a 6×16 image area and a 10×6 image area out of the 16×16 image area to be outputted seventh to the overlap processor 112 are subjected to overlap processing. The overlap processor 112 inputs the seventh 16×16 image area and performs overlap processing on the 6×16 and 10×6 image areas. The 6×16 image area has a 6×14 image area F71 and a 6×2 image area F72. The 10×6 image area has an 8×6 image area F73 and a 2×6 image area F74.

The image area F4222, the image area F52, a 2×14 image area F621 of the image area F62, and the image area F71 together compose the 8×16 image area subjected to the overlap processing. An 8×2 image area F5421 of the image area F542, and the image area F73 together compose the 8×8 image area subjected to overlap processing. The overlap processor 112 outputs the 8×16 and 8×8 image areas to the frequency conversion section 113, which performs frequency conversion on the 8×16 and 8×8 image areas.

The overlap processor 112 holds the image data of the image area F74, a 2×2 image area F5422 of the image area F542, a 16×2 image area F622 of the image area F62, and the image area F72.

Figure 7H:
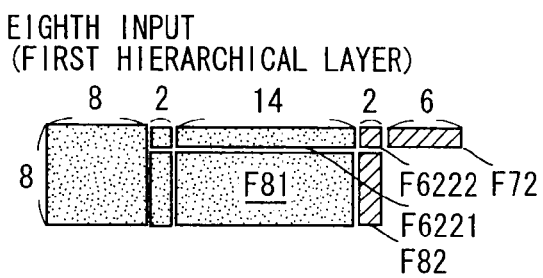

As shown in FIG. 7H, the input image adjuster 111 adjusts the input image so that only a 16×6 image area out of the 16×16 image area to be outputted eighth to the overlap processor 112 is subjected to overlap processing. The overlap processor 112 inputs the eighth 16×16 image area and performs overlap processing on the 16×6 image area. The 16×6 image area has a 14×6 image area F81 and a 2×6 image area F82.

The image area F5422, a 14×2 image area F6221 of the image area F622, the image area F74 and the image area F81 together compose the 16×8 image area subjected to overlap processing. The overlap processor 112 outputs the 16×8 image area to the frequency conversion section 113, which performs frequency conversion on the 16×8 image area.

The overlap processor 112 holds the image data of the image area F82, a 2×2 image area F6222 of the image area F622, and the image area F72.

Figure 7I:
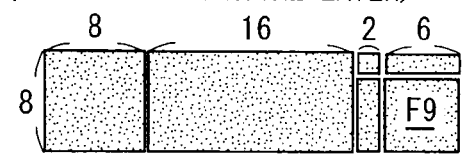

As shown in FIG. 7I, the input image adjuster 111 adjusts the input image so that only a 6×6 image area out of the 16×16 image area to be outputted ninth to the overlap processor 112 is subjected to overlap processing. The overlap processor 112 inputs the ninth 16×16 image area and performs overlap processing on the 6×6 image area. The 6×6 image area has a 6×6 image area F9.

The image areas F6222, F72, F82, and F9 together compose the 8×8 image area subjected to overlap processing. The overlap processor 112 outputs the 8×8 image area to the frequency conversion section 113, which performs frequency conversion on the 8×8 image area. When the above-described processing is complete, the processing on the first hierarchical layer 11 is complete.

On the first hierarchical layer 11, the overlap processor 112 is only required to hold the image data of the image areas hatched in FIGS. 7A to 7I. More specifically, the overlap processor 112 only needs to hold image data of up to 16×(2+1)×2=96 pixels.

In a general case where the original image includes N image areas of 16×16 in the horizontal direction, on the first hierarchical layer 11, the overlap processor 112 is only required to hold image data of up to 16(N+1)×2 pixels.

[The Processing Flow on the Second Hierarchical Layer]

Figure 8A:
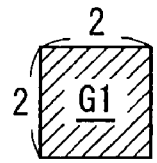
FIGS. 8A to 8I show the encoding process according to the third embodiment.

As shown in FIG. 8A, the input image adjuster 121 inputs 2×2 DC components on the first hierarchical layer 11. The input image adjuster 121 then adjusts the input image so that only a 2×2 image area G1 out of the 4×4 image area to be outputted first to the overlap processor 122 is subjected to overlap processing. The overlap processor 122 performs overlap processing on the image area G1 and holds the image data.

The input image adjuster 111 is required to adjust the input image so that only a 10×10 image area is subjected to overlap processing. The reason is described as follows.

The horizontal and vertical displacement between the block area and the overlap processing area on the second hierarchical layer 12 is 2. Therefore, the input image adjuster 121 adjusts the input image so that only a 2×2 image area is subjected to overlap processing. To make the input image adjuster 121 input a 2×2 image area, the frequency conversion section 113 is required to input an image area of (2×4)×(2×4)=8×8.

The horizontal and vertical displacement between the block area and the overlap processing area on the first hierarchical layer 11 is 2. Therefore, the input image adjuster 111 adjusts the input image so that only an image area of (8+2)×(8+2)=10×10 is subjected to overlap processing.

Figure 8B:
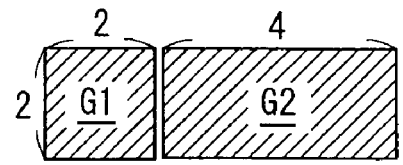

As shown in FIG. 8B, the input image adjuster 121 inputs 4×2 DC components on the first hierarchical layer 11. The input image adjuster 121 then adjusts the input image so that only a 4×2 image area G2 out of the 4×4 image area to be outputted second to the overlap processor 122 is subjected to overlap processing. The overlap processor 122 performs overlap processing on the image area G2 and holds the image data.

Figure 8C:
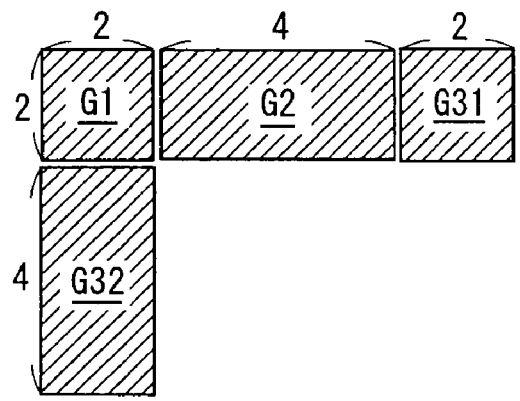

As shown in FIG. 8C, the input image adjuster 121 inputs 2×2 and 2×4 DC components on the first hierarchical layer 11. The input image adjuster 121 then adjusts the input image so that only a 2×2 image area G31 and a 2×4 image area G32 out of the 4×4 image area to be outputted third to the overlap processor 122 are subjected to overlap processing. The image areas G31 and G32 are fitted into a single 4×4 image area. The overlap processor 122 performs overlap processing on the image areas G31 and G32, and holds the image data.

Figure 8D:
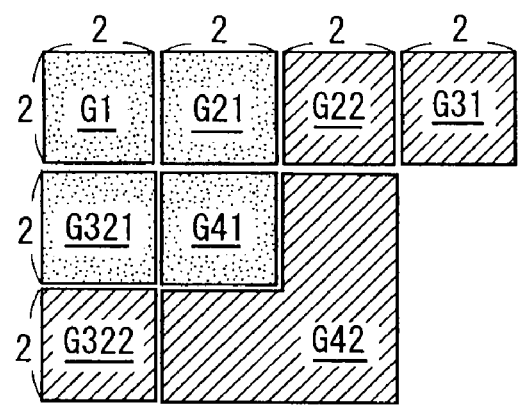

As shown in FIG. 8D, the input image adjuster 121 inputs 4×4 DC components on the first hierarchical layer 11. The input image adjuster 121 then adjusts the input image so that the whole of the 4×4 image area to be outputted fourth to the overlap processor 122 is subjected to overlap processing. The overlap processor 122 performs overlap processing on the 4×4 image area. The 4×4 image area has a 2×2 image area G41 and the remaining image area G42.

The image area G1, a 2×2 image area G21 of the image area G2, a 2×2 image area G321 of the image area G32, and the image area G41 together compose the 4×4 image area subjected to overlap processing. The overlap processor 122 outputs the 4×4 image area to the frequency conversion section 123, which performs frequency conversion on the 4×4 image area.

The overlap processor 122 holds the image data of a 2×2 image area G322 of the image area G32, the image area G42, a 2×2 image area G22 of the image area G2, and the image area G31.

Figure 8E:
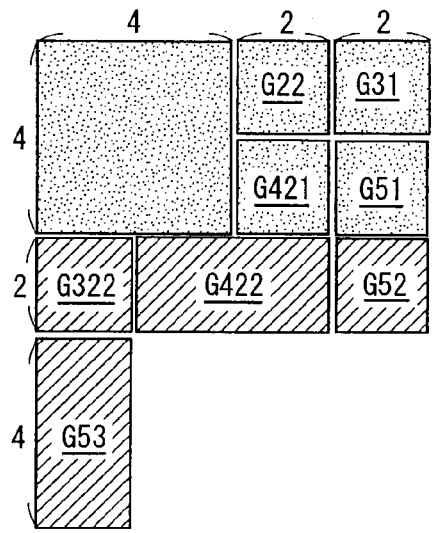

As shown in FIG. 8E, the input image adjuster 121 inputs two 2×4 DC components on the first hierarchical layer 11. The input image adjuster 121 then adjusts the input image so that the whole of the 4×4 image area to be outputted fifth to the overlap processor 122 is subjected to overlap processing. The overlap processor 122 performs overlap processing on the 4×4 image area. The 4×4 image area has a 2×2 image area G51, a 2×2 image area G52, and a 2×4 image area G53.

The image area G22, the image area G31, a 2×2 image area G421 of the image area G42, and the image area G51 together compose the 4×4 image area subjected to overlap processing. The overlap processor 122 outputs the 4×4 image area to the frequency conversion section 123, which performs frequency conversion on the 4×4 image area.

The overlap processor 122 holds the image data of the image area G53, the image area G322, a 4×2 image area G422 of the image area G42, and the image area G52.

Figure 8F:
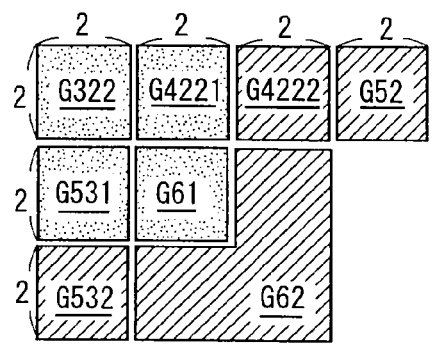

As shown in FIG. 8F, the input image adjuster 121 inputs 4×4 DC components on the first hierarchical layer 11. The input image adjuster 121 then adjusts the input image so that the whole of the 4×4 image area to be outputted sixth to the overlap processor 122 is subjected to overlap processing. The overlap processor 122 performs overlap processing on the 4×4 image area. The 4×4 image area has a 2×2 image area G61 and the remaining image area G62.

The image area G322, a 2×2 image area G4221 of the image area G422, a 2×2 image area G531 of the image area G53, and the image area G61 together compose the 4×4 image area subjected to overlap processing. The overlap processor 122 outputs the 4×4 image area to the frequency conversion section 123, which performs frequency conversion on the 4×4 image area.

The overlap processor 122 holds the image data of a 2×2 image area G532 of the image area G53, the image area G62, a 2×2 image area G4222 of the image area G422, and the image area G52.

Figure 8G:
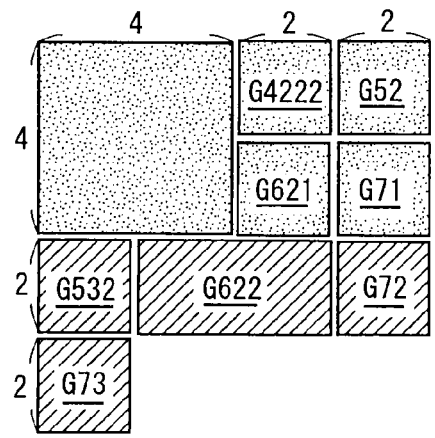

As shown in FIG. 8G, the input image adjuster 121 inputs 2×4 and 2×2 DC components on the first hierarchical layer 11. The input image adjuster 121 then adjusts the input image so that only image areas G71, G72, and G73 of 2×2 out of the 4×4 image area to be outputted seventh to the overlap processor 122 are subjected to overlap processing. The image areas G71, G72, and G73 are fitted into a single 4×4 image area. The overlap processor 122 performs overlap processing on the image areas G71, G72, and G73.

The image area G4222, the image area G52, a 2×2 image area G621 of the image area G62, and the image area G71 together compose the 4×4 image area subjected to overlap processing. The overlap processor 122 outputs the 4×4 image area to the frequency conversion section 123, which performs frequency conversion on the 4×4 image area.

The overlap processor 122 holds the image data of the image area G73, the image area G532, a 4×2 image area G622 of the image area G62, and the image area G72.

Figure 8H:
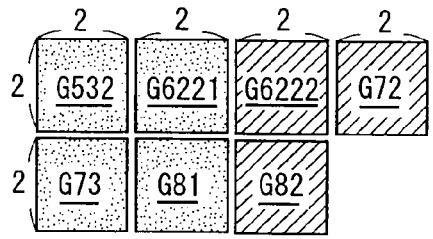

As shown in FIG. 8H, the input image adjuster 121 inputs 4×2 DC components on the first hierarchical layer 11. The input image adjuster 121 then adjusts the input image so that only image areas G81 and G82 of 2×2 out of the 4×4 image area to be outputted eighth to the overlap processor 122 are subjected to overlap processing. The image areas G81 and G82 are fitted into a single 4×4 image area. The overlap processor 122 performs overlap processing on the image areas G81 and G82.

The image area G532, a 2×2 image area G6221 of the image area G622, the image area G73, and the image area G81 together compose the 4×4 image area subjected to overlap processing. The overlap processor 122 outputs the 4×4 image area to the frequency conversion section 123, which performs frequency conversion on the 4×4 image area.

The overlap processor 122 holds the image data of the image area G82, a 2×2 image area G6222 of the image area G622, and the image area G72.

Figure 8I:
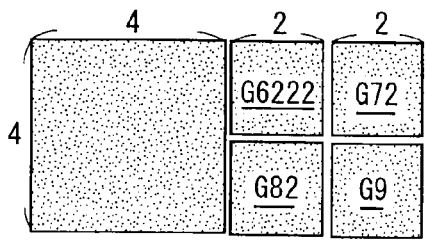

As shown in FIG. 8I, the input image adjuster 121 inputs 2×2 DC components on the first hierarchical layer 11. The input image adjuster 121 then adjusts the input image so that only a 2×2 image area G9 out of the 4×4 image area to be outputted ninth to the overlap processor 122 is subjected to overlap processing. The overlap processor 122 performs overlap processing on the image area G9.

The image areas G6222, G72, G82, and G9 together compose the 4×4 image area subjected to overlap processing. The overlap processor 122 outputs the 4×4 image area to the frequency conversion section 123, which performs frequency conversion on the 4×4 image area. When the above-described processing is complete, the processing on the second hierarchical layer 12 is complete.

On the second hierarchical layer 12, the overlap processor 122 is only required to hold the image data of the image areas hatched in FIGS. 8A to 8I. More specifically, the overlap processor 122 only needs to hold image data corresponding up to 4×(2+1)×2=24 pixels.

In a general case where the original image includes N image areas of 16×16 in the horizontal direction, on the second hierarchical layer 12, the overlap processor 122 is only required to hold image data corresponding up to 4(N+1)×2 pixels.

Fourth Embodiment

The following is a description, with reference to FIGS. 9A to 9G and 10A to 10I, of the processing flow of the decoder 2 according to the fourth embodiment. The decoder 2 according to the fourth embodiment is identical to the decoder 2 shown in FIG. 4. Overlap inverse processing is performed on the second and first hierarchical layers 22 and 23 as shown in FIGS. 9A to 9G and 10A to 10I, respectively. The decoder 2 outputs a 32×48 expanded image consisting of two 16×16 image areas in the horizontal direction and three 16×16 image areas in the vertical direction.

[The Processing Flow on the Second Hierarchical Layer]

Figure 9A:
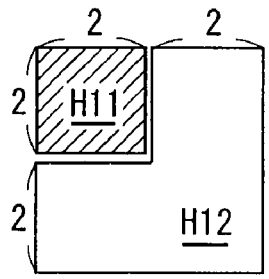
FIGS. 9A to 9G show the decoding process according to the fourth embodiment.

As shown in FIG. 9A, the frequency inversion section 221 inputs 4×4 DC and AC components on the second hierarchical layer 22. The overlap inverse processor 222 inputs the first frequency-inverted 4×4 image area from the frequency inversion section 221. The 4×4 image area has a 2×2 image area H11 and the remaining image area H12. The overlap inverse processor 222 performs overlap inverse processing on the image area H11, and outputs it to the output image adjuster 223.

The output image adjuster 223 adjusts the output image so that only the image area H11 out of the 4×4 image area to be outputted first to the first hierarchical layer 23 composes the DC components on the first hierarchical layer 23. The overlap inverse processor 222 does not perform overlap inverse processing on the image area H12 and holds the image data.

Figure 9B:
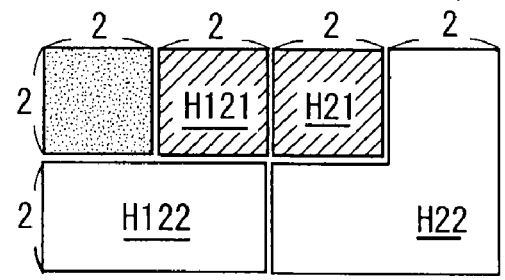

As shown in FIG. 9B, the frequency inversion section 221 inputs 4×4 DC and AC components on the second hierarchical layer 22. The overlap inverse processor 222 inputs the second frequency-inverted 4×4 image area from the frequency inversion section 221. The 4×4 image area has a 2×2 image area H21 and the remaining image area H22. The overlap inverse processor 222 performs overlap inverse processing on a 2×2 image area H121 of the image area H12 and the image area H21, and outputs them to the output image adjuster 223.

The output image adjuster 223 adjusts the output image so that only the image areas H121 and H21 out of the 4×4 image area to be outputted second to the first hierarchical layer 23 compose the DC components on the first hierarchical layer 23. The image areas H121 and H21 are fitted into a single 4×4 image area. The overlap inverse processor 222 does not perform overlap inverse processing on a 4×2 image area H122 of the image area H12 and the image area H22, and holds the image data.

Figure 9C:
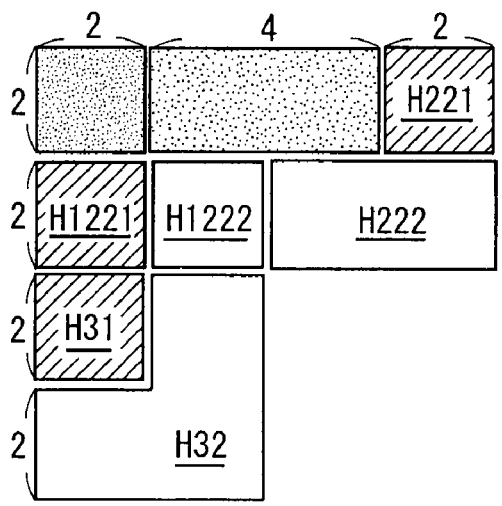

As shown in FIG. 9C, the frequency inversion section 221 inputs 4×4 DC and AC components on the second hierarchical layer 22. The overlap inverse processor 222 inputs the third frequency-inverted 4×4 image area from the frequency inversion section 221. The 4×4 image area has a 2×2 image area H31 and the remaining image area H32. The overlap inverse processor 222 performs overlap inverse processing on a 2×2 image area H221 of the image area H22, a 2×2 image area H1221 of the image area H122 and the image area H31, and outputs them to the output image adjuster 223.

The output image adjuster 223 adjusts the output image so that only the image areas H221, H1221, and H31 out of the 4×4 image area to be outputted third to the first hierarchical layer 23 compose the DC components on the first hierarchical layer 23. The image areas H221, H1221, and H31 are fitted into a single 4×4 image area. The overlap inverse processor 222 does not perform overlap inverse processing on the image area H32, a 2×2 image area H1222 of the image area H1122 and a 4×2 image area H222 of the image area H22, and holds the image data.

Figure 9D:
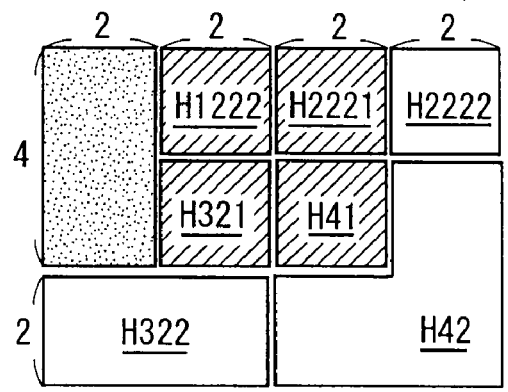

As shown in FIG. 9D, the frequency inversion section 221 inputs 4×4 DC and AC components on the second hierarchical layer 22. The overlap inverse processor 222 inputs the fourth frequency-inverted 4×4 image area from the frequency inversion section 221. The 4×4 image area has a 2×2 image area H41 and the remaining image area H42. The overlap inverse processor 222 performs overlap inverse processing on the image area H1222, a 2×2 image area H2221 of the image area H222, a 2×2 image area H321 of the image area H32 and the image area H41, and outputs them to the output image adjuster 223.

The output image adjuster 223 adjusts the output image so that the whole of the 4×4 image area to be outputted fourth to the first hierarchical layer 23 composes the DC components on the first hierarchical layer 23. The image areas H1222, H2221, H321, and H41 are fitted into a single 4×4 image area. The overlap inverse processor 222 does not perform overlap inverse processing on a 4×2 image area H322 of the image area H32, the image area H42 and a 2×2 image area H2222 of the image area H222, and holds the image data.

Figure 9E:
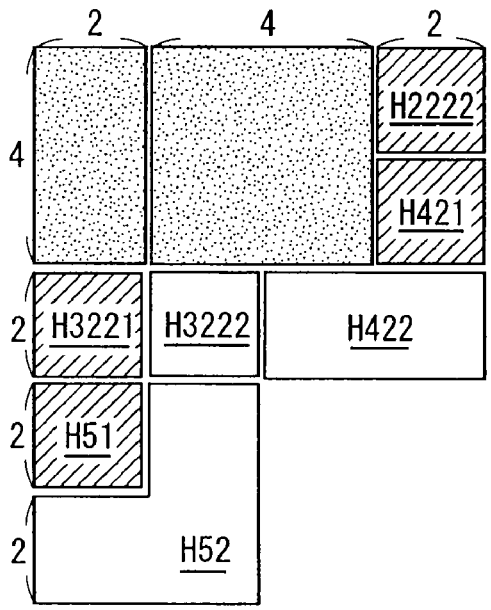

As shown in FIG. 9E, the frequency inversion section 221 inputs 4×4 DC and AC components on the second hierarchical layer 22. The overlap inverse processor 222 inputs the fifth frequency-inverted 4×4 image area from the frequency inversion section 221. The 4×4 image area has a 2×2 image area H51 and the remaining image area H52. The overlap inverse processor 222 performs overlap inverse processing on the image area H2222, a 2×2 image area H421 of the image area H42, a 2×2 image area H3221 of the image area H322 and the image area H51, and outputs them to the output image adjuster 223.

The output image adjuster 223 adjusts the output image so that the whole of the 4×4 image area to be outputted fifth to the first hierarchical layer 23 composes the DC components on the first hierarchical layer 23. The image areas H2222, H421, H3221, and H51 are fitted into a single 4×4 image area. The overlap inverse processor 222 does not perform overlap inverse processing on the image area H52, a 2×2 image area H3222 of the image area H322 and a 4×2 image area H422 of the image area H42, and holds the image data.

Figure 9F:
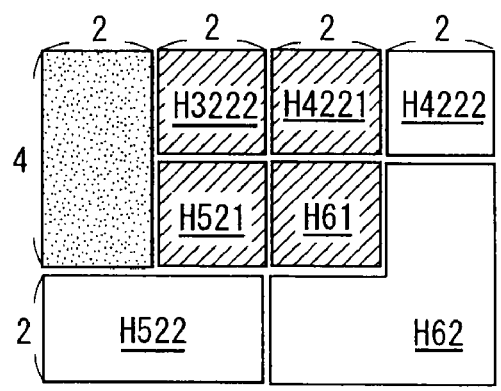

As shown in FIG. 9F, the frequency inversion section 221 inputs 4×4 DC and AC components on the second hierarchical layer 22. The overlap inverse processor 222 inputs the sixth frequency-inverted 4×4 image area from the frequency inversion section 221. The 4×4 image area has a 2×2 image area H61 and the remaining image area H62. The overlap inverse processor 222 performs overlap inverse processing on the image area H3222, a 2×2 image area H4221 of the image area H422, a 2×2 image area H521 of the image area H52 and the image area H61, and outputs them to the output image adjuster 223.

The output image adjuster 223 adjusts the output image so that the whole of the 4×4 image area to be outputted sixth to the first hierarchical layer 23 composes the DC components on the first hierarchical layer 23. The image areas H3222, H4221, H521, and H61 are fitted into a single 4×4 image area. The overlap inverse processor 222 does not perform overlap inverse processing on a 4×2 image area H522 of the image area H52, the image area H62 and a 2×2 image area H4222 of the image area H422, and holds the image data.

When the above-described processing is complete, the overlap inverse processor 222 completes the input of the frequency-inverted 4×4 image areas from the frequency inversion section 221. The overlap inverse processor 222 continues to perform overlap inverse processing on the image areas corresponding to the held image data.

Figure 9G:
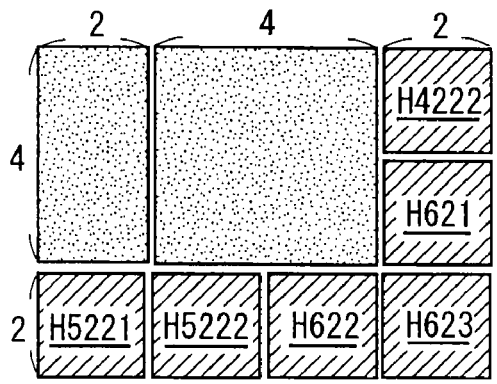

As shown in FIG. 9G, the overlap inverse processor 222 performs overlap inverse processing on the image area H4222, a 2×2 image area H621 of the image area H62 and a 2×2 image area H5221 of the image area H522, and outputs them to the output image adjuster 223.

The output image adjuster 223 adjusts the output image so that only the image areas H4222, H621, and H5221 out of the 4×4 image area to be outputted seventh to the first hierarchical layer 23 compose the DC components on the first hierarchical layer 23. The image areas H4222, H621, and H5221 are fitted into a single 4×4 image area.

As shown in FIG. 9G, the overlap inverse processor 222 performs overlap inverse processing on a 2×2 image area H5222 of the image area H522 and a 2×2 image area H622 of the image area H62, and outputs them to the output image adjuster 223.

The output image adjuster 223 adjusts the output image so that only the image areas H5222 and H622 out of the 4×4 image area to be outputted eighth to the first hierarchical layer 23 compose the DC components on the first hierarchical layer 23. The image areas H5222 and H622 are fitted into a single 4×4 image area.

As shown in FIG. 9G, the overlap inverse processor 222 performs overlap inverse processing on a 2×2 image area H623 of the image area H62, and outputs it to the output image adjuster 223.

The output image adjuster 223 adjusts the output image so that only the image area H623 out of the 4×4 image area to be outputted ninth to the first hierarchical layer 23 composes the DC components on the first hierarchical layer 23. When the above-described processing is complete, the processing on the second hierarchical layer 22 is complete.

On the second hierarchical layer 22, the overlap inverse processor 222 is only required to hold the image data of the image areas of the white background in FIGS. 9A to 9G. More specifically, the overlap inverse processor 222 only needs to hold image data corresponding up to 4×(2+1)×2=24 pixels.

In a general case where the expanded image includes N image areas of 16×16 in the horizontal direction, on the second hierarchical layer 22, the overlap inverse processor 222 is only required to hold image data corresponding up to 4 (N+1)×2 pixels.

[The Processing Flow on the First Hierarchical Layer]

Figure 10A:
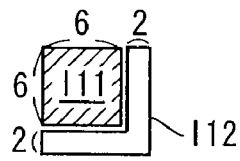
FIGS. 10A to 10I show the decoding process according to the fourth embodiment.

As shown in FIG. 10A, the frequency inversion section 231 inputs 2×2 DC components on the first hierarchical layer 23 and the AC components corresponding to the DC components. The overlap inverse processor 232 inputs the first frequency-inverted 8×8 image area from the frequency inversion section 231. The 8×8 image area has a 6×6 image area I11 and the remaining image area I12. The overlap inverse processor 232 performs overlap inverse processing on the image area I11, and outputs it to the output image adjuster 233.

The output image adjuster 233 adjusts the output image so that only the image area I11 out of the 16×16 image area to be outputted first outside the decoder 2 composes the expanded image. The overlap inverse processor 232 does not perform overlap inverse processing on the image area I12, and holds the image data.

Figure 10B:
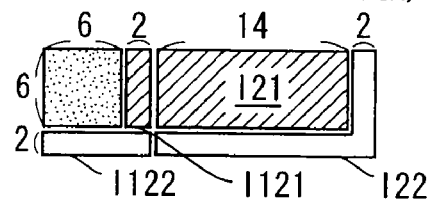

As shown in FIG. 10B, the frequency inversion section 231 inputs 4×2 DC components on the first hierarchical layer 23 and the AC components corresponding to the DC components. The overlap inverse processor 232 inputs the second frequency-inverted 16×8 image area from the frequency inversion section 231. The 16×8 image area has a 14×6 image area I21 and the remaining image area I22. The overlap inverse processor 232 performs overlap inverse processing on a 2×6 image area I121 of the image area I12 and the image area I21, and outputs them to the output image adjuster 233.

The output image adjuster 233 adjusts the output image so that only the image areas I121 and I21 out of the 16×16 image area to be outputted second outside the decoder 2 compose the expanded image. The image areas I121 and I21 are fitted into a single 16×16 image area. The overlap inverse processor 232 does not perform overlap inverse processing on an 8×2 image area I122 of the image area I12 and the image area I22, and holds the image data.

Figure 10C:
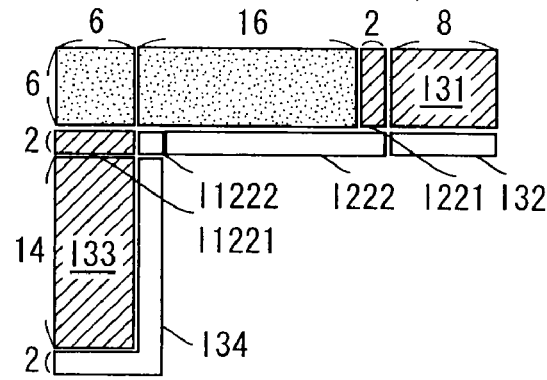

As shown in FIG. 10C, the frequency inversion section 231 inputs 2×2 and 2×4 DC components on the first hierarchical layer 23 and the AC components corresponding to the DC components. The overlap inverse processor 232 inputs the third frequency-inverted 8×8 and 8×16 image areas from the frequency inversion section 231. The 8×8 image area has an 8×6 image area I31 and an 8×2 image area I32. The 8×16 image area has a 6×14 image area I33 and the remaining image area I34. The overlap inverse processor 232 performs overlap inverse processing on a 2×6 image area I221 of the image area I22, the image area I31, a 6×2 image area I1221 of the image area I122 and the image area I33, and outputs them to the output image adjuster 233.

The output image adjuster 233 adjusts the output image so that only the image areas I221, I31, I1221, and I33 out of the 16×16 image area to be outputted third outside the decoder 2 compose the expanded image. The image areas I221, I31, I1221, and I33 are fitted into a single 16×16 image area. The overlap inverse processor 232 does not perform overlap inverse processing on the image area I34, a 2×2 image area I1222 of the image area I122, a 16×2 image area I222 of the image area I22 and the image area I32, and holds the image data.

Figure 10D:
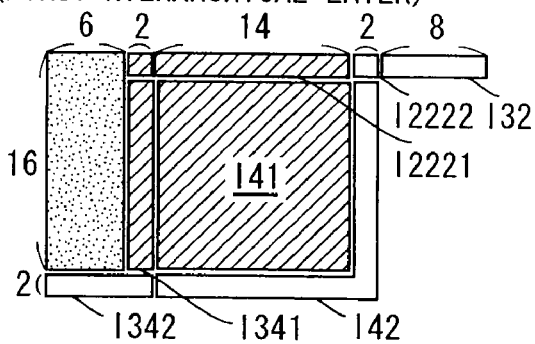

As shown in FIG. 10D, the frequency inversion section 231 inputs 4×4 DC components on the first hierarchical layer 23 and the AC components corresponding to the DC components. The overlap inverse processor 232 inputs the fourth frequency-inverted 16×16 image area from the frequency inversion section 231. The 16×16 image area has a 14×14 image area I41 and the remaining image area I42. The overlap inverse processor 232 performs overlap inverse processing on the image area I1222, a 14×2 image area I2221 of the image area I222, a 2×14 image area I341 of the image area I34 and the image area I41, and outputs them to the output image adjuster 233.

The output image adjuster 233 adjusts the output image so that the whole of the 16×16 image area to be outputted fourth outside the decoder 2 composes the expanded image. The image areas I1222, I2221, I341, and I41 are fitted into a single 16×16 image area. The overlap inverse processor 232 does not perform overlap inverse processing on an 8×2 image area I342 of the image area I34, the image area I42, a 2×2 image area I2222 of the image area I222 and the image area I32, and holds the image data.

Figure 10E:
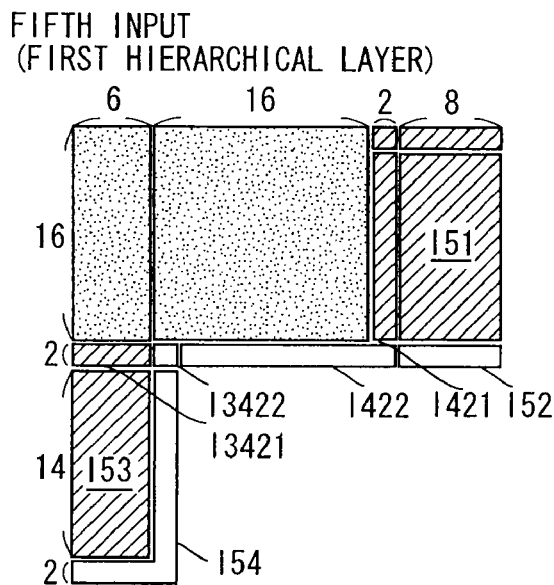

As shown in FIG. 10E, the frequency inversion section 231 inputs two 2×4 DC components on the first hierarchical layer 23 and the AC components corresponding to the DC components. The overlap inverse processor 232 inputs the fifth frequency-inverted two 8×16 image areas from the frequency inversion section 231. The first 8×16 image area has an 8×14 image area I51 and an 8×2 image area I52. The second 8×16 image area has a 6×14 image area I53 and the remaining image area I54. The overlap inverse processor 232 performs overlap inverse processing on the image area I2222, the image area I32, a 2×14 image area I421 of the image area I42, the image area I51, a 6×2 image area I3421 of the image area I342 and the image area I53, and outputs them to the output image adjuster 233.

The output image adjuster 233 adjusts the output image so that the whole of the 16×16 image area to be outputted fifth outside the decoder 2 composes the expanded image. The image areas I2222, I32, I421, I51, I3421, and I53 are fitted into a single 16×16 image area. The overlap inverse processor 232 does not perform overlap inverse processing on the image area I54, a 2×2 image area I3422 of the image area I342, a 16×2 image area I422 of the image area I42 and the image area I52, and holds the image data.

Figure 10F:
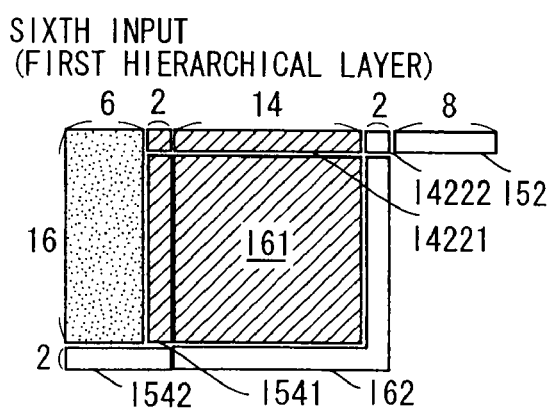

As shown in FIG. 10F, the frequency inversion section 231 inputs 4×4 DC components on the first hierarchical layer 23 and the AC components corresponding to the DC components. The overlap inverse processor 232 inputs the sixth frequency-inverted 16×16 image area from the frequency inversion section 231. The 16×16 image area has a 14×14 image area I61 and the remaining image area I62. The overlap inverse processor 232 performs overlap inverse processing on the image area I3422, a 14×2 image area I4221 of the image area I422, a 2×14 image area I541 of the image area I54 and the image area I61, and outputs them to the output image adjuster 233.

The output image adjuster 233 adjusts the output image so that the whole of the 16×16 image area to be outputted sixth outside the decoder 2 composes the expanded image. The image areas I3422, I4221, I541, and I61 are fitted into a single 16×16 image area. The overlap inverse processor 232 does not perform overlap inverse processing on an 8×2 image area I542 of the image area I54, the image area I62, a 2×2 image area I4222 of the image area I422 and the image area I52, and holds the image data.

Figure 10G:
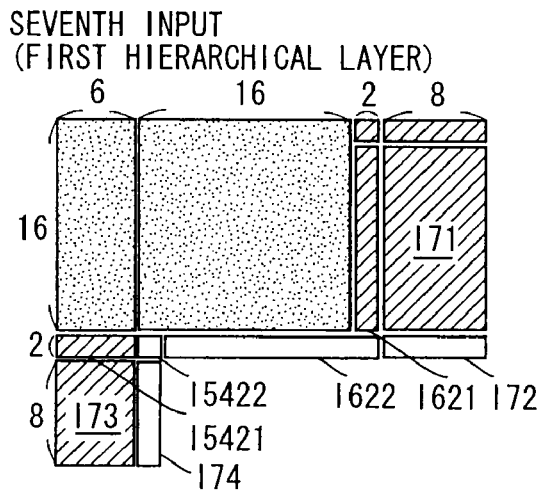

As shown in FIG. 10G, the frequency inversion section 231 inputs 2×4 and 2×2 DC components on the first hierarchical layer 23 and the AC components corresponding to the DC components. The overlap inverse processor 232 inputs the seventh frequency-inverted 8×16 and 8×8 image areas from the frequency inversion section 231. The 8×16 image area has an 8×14 image area I71 and an 8×2 image area I72. The 8×8 image area has a 6×8 image area I73 and a 2×8 image area I74. The overlap inverse processor 232 performs overlap inverse processing on the image area I4222, the image area I52, a 2×14 image area I621 of the image area I62, the image area I71, a 6×2 image area I5421 of the image area I542 and the image area I73, and outputs them to the output image adjuster 233.

The output image adjuster 233 adjusts the output image so that only the image areas I4222, I52, I621, I71, I5421, and I73 out of the 16×16 image area to be outputted seventh outside the decoder 2 compose the expanded image. The image areas I4222, I52, I621, I71, I5421, and I73 are fitted into a single 16×16 image area. The overlap inverse processor 232 does not perform overlap inverse processing on the image area I74, a 2×2 image area I5422 of the image area I542, a 16×2 image area I622 of the image area I62 and the image area I72, and holds the image data.

Figure 10H:
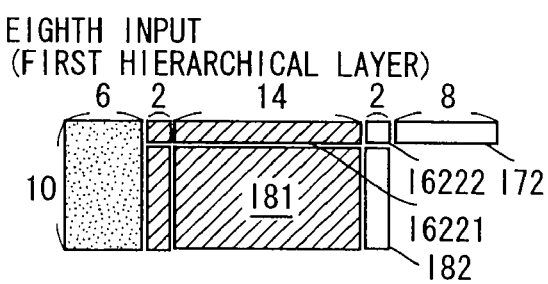

As shown in FIG. 10H, the frequency inversion section 231 inputs 4×2 DC components on the first hierarchical layer 23 and the AC components corresponding to the DC components. The overlap inverse processor 232 inputs the eighth frequency-inverted 16×8 image area from the frequency inversion section 231. The 16×8 image area has a 14×8 image area I81 and a 2×8 image area I82. The overlap inverse processor 232 performs overlap inverse processing on the image area I5422, a 14×2 image area I6221 of the image area I622, the image area I74 and the image area I81, and outputs them to the output image adjuster 233.

The output image adjuster 233 adjusts the output image so that only the image areas I5422, I6221, I74, and I81 out of the 16×16 image area to be outputted eighth outside the decoder 2 compose the expanded image. The image areas I5422, I6221, I74, and I81 are fitted into a single 16×16 image area. The overlap inverse processor 232 does not perform overlap inverse processing on the image area I82, a 2×2 image area I6222 of the image area I622 and the image area I72, and holds the image data.

Figure 10I:
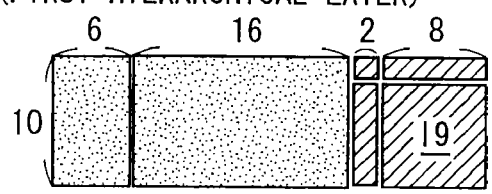

As shown in FIG. 10I, the frequency inversion section 231 inputs 2×2 DC components on the first hierarchical layer 23 and the AC components corresponding to the DC components. The overlap inverse processor 232 inputs the ninth frequency-inverted 8×8 image area from the frequency inversion section 231. The 8×8 image area has an 8×8 image area I9. The overlap inverse processor 232 performs overlap inverse processing on the image areas I6222, I72, I82 and I9, and outputs them to the output image adjuster 233.

The output image adjuster 233 adjusts the output image so that only the image areas I6222, I72, I82, and I9 out of the 16×16 image area to be outputted ninth outside the decoder 2 compose the expanded image. The image areas I6222, I72, I82, and I9 are fitted into a single 16×16 image area. When the above-described processing is complete, the processing on the first hierarchical layer 23 is complete.

On the first hierarchical layer 23, the overlap inverse processor 232 is only required to hold the image data of the image areas of the white background in FIGS. 10A to 10I. More specifically, the overlap inverse processor 232 only needs to hold image data corresponding up to 16×(2+1)×2=96 pixels.

In a general case where the expanded image includes N image areas of 16×16 in the horizontal direction, on the first hierarchical layer 23, the overlap inverse processor 232 is only required to hold image data corresponding up to 16(N+1)×2 pixels.

Fifth Embodiment

Figure 11:
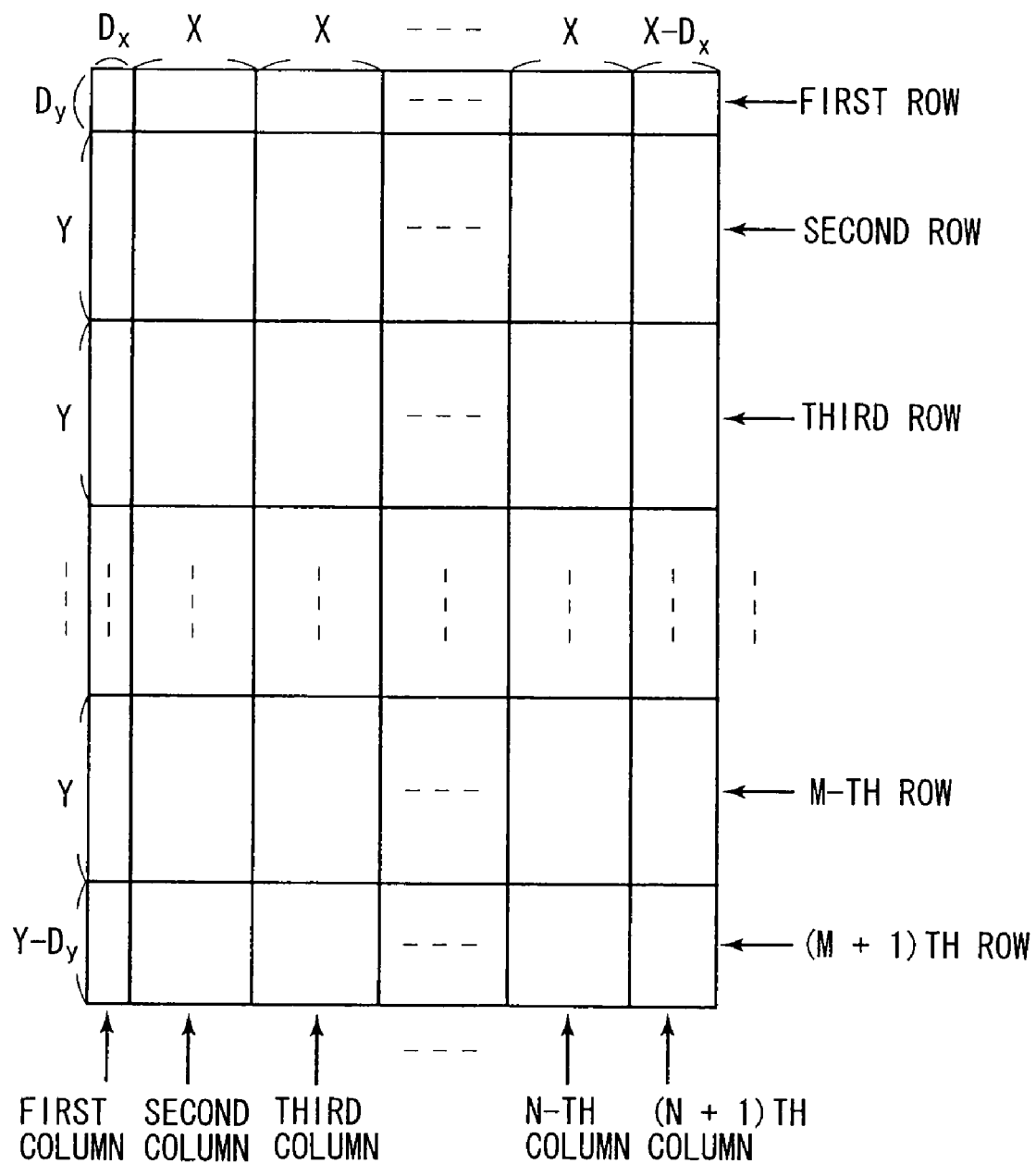
FIG. 11 shows the encoding process according to the fifth and sixth embodiments.

The fifth embodiment is described as follows. The encoder according to the fifth embodiment is achieved by generating the encoder 1 according to the first embodiment. More specifically, overlap processing is not performed on two consecutive ones of the hierarchical layers of the encoder according to the fifth embodiment. Therefore, the overall processing flow on a single hierarchical layer is described as follows with reference to FIG. 11.

A frequency-unconverted image which is inputted on a single hierarchical layer has N image areas of X×Y in the horizontal direction and M image areas of X×Y in the vertical direction. The input image adjuster inputs the frequency-unconverted image using an X×Y image area as an input unit area, but does not output the input unit area intact to the overlap processor.

The input image adjuster selects overlap processing areas from the input unit area. The input image adjuster then fits the overlap processing areas into an image area the same size as the input unit area, and outputs the image area to the overlap processor. How the input image adjuster selects the overlap processing areas is described as follows with reference to FIG. 11.

The input image adjuster selects, as overlap processing areas to be arranged in the first row, a Dx×Dy image area for the first column, a (X−Dx)×Dy image area for the (N+1)th column, and an X×Dy image area for the other columns.

The input image adjuster then selects, as overlap processing areas to be arranged in the second to M-th rows, a Dx×Y image area for the first column, a (X−Dx)×Y image area for the (N+1)th column, and an X×Y image area for the other columns.

The input image adjuster then selects, as overlap processing areas to be arranged in the (M+1)th row, a Dx×(Y−Dy) image area for the first column, a (X−Dx)×(Y−Dy) image area for the (N+1)th column, and an X×(Y−Dy) image area for the other columns.

The input image adjuster selects, as an overlap processing area to be arranged in the (N+1)th column of a certain row, an image area having a horizontal width of X−Dx. The input image adjuster selects, as an overlap processing area to be arranged in the first column of the next row, an image area having a horizontal width of Dx. The input image adjuster then fits these overlap processing areas into an image area the same size as the input unit area, and outputs the image area to the overlap processor.

Figure 13:
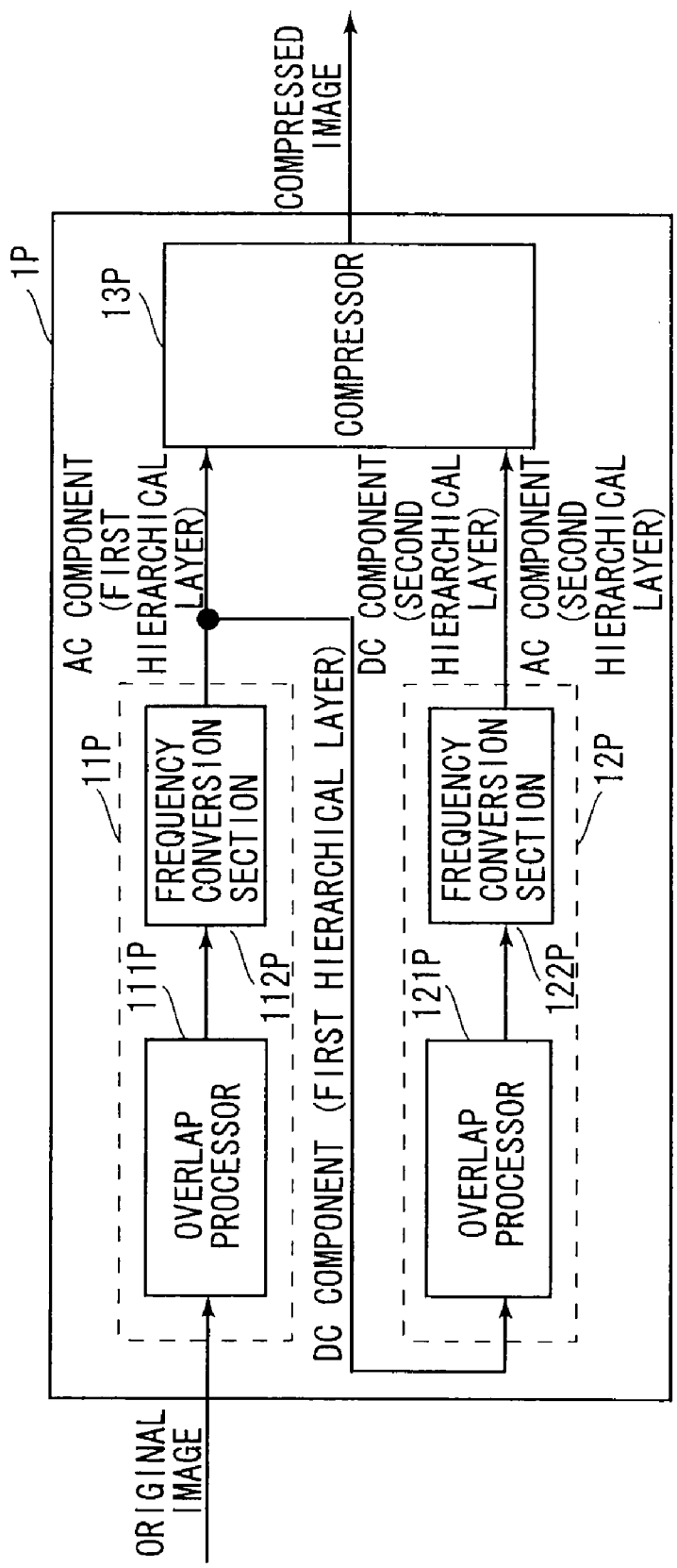
FIG. 13 is a block diagram of the encoder according to the background art.

The number of columns in which to arrange the overlap processing areas is larger by one than the number of columns in which to arrange the overlap processing areas in the encoder 1P shown in FIG. 13 (see FIGS. 17A to 17F). The number of rows in which to arrange the overlap processing areas is larger by one than the number of rows in which to arrange the overlap processing areas in the encoder 1P shown in FIG. 13 (see FIGS. 17 A to 17F).

However, the input image adjuster can fit the overlap processing area to be arranged in the (N+1)th column of the certain row and the overlap processing area to be arranged in the first column of the next row into an image area the same size as the input unit area, and output the image area to the overlap processor. In addition, as described from now on, the overlap processor can reduce the maximum image data capacity to be held. Therefore, the encoder according to the fifth embodiment maximizes the advantage of the high performance achieved by hardware implementation.

The overlap processor performs overlap processing on the overlap processing areas. Of the areas subjected to overlap processing, the overlap processor outputs to the frequency conversion section a frequency converting unit area, which can be frequency-converted, but not the image areas which cannot be frequency-converted. The overlap processor holds the image data of the image areas which cannot be frequency-converted.

Of the areas subjected to overlap processing by the overlap processor, the maximum image area that cannot be frequency-converted has first and second linear areas. The first linear area has a horizontal width of Dx and a vertical width which is equal to the vertical width of the input unit area. The second linear area has a vertical width of Dy and a horizontal width which is equal to the horizontal width of the frequency-unconverted image. The second linear area can be either a single consecutive linear area as shown in FIG. 2C or two separate linear areas as shown in FIG. 2D.

Thus, the overlap processor can reduce the maximum image data capacity to be held. As a result, the encoder according to the fifth embodiment maximizes the advantage of the high performance achieved by hardware implementation.

The encoder according to the fifth embodiment is achieved by generating the encoder 1 according to the first embodiment. More specifically, in the encoder 1 according to the first embodiment, Dx=2, Dy=2, X=16, Y=16, N=2, and M=3. In other words, Dx and Dy represent the horizontal displacement and the vertical displacement, respectively, between the overlap processing unit area and the frequency converting unit area.

Alternatively, Dx may represent the number of pixels other than the horizontal displacement between the overlap processing unit area and the frequency converting unit area. Similarly, Dy may alternatively represent the number of pixels other than the vertical displacement between the overlap processing unit area and the frequency converting unit area. In the encoder 1 according to the first embodiment, it is alternatively possible that Dx=6 and Dy=6.

Of the 6×6 image area subjected to overlap processing, the overlap processor outputs the 4×4 frequency converting unit area to the frequency conversion section, but not the remaining image area. The overlap processor holds the image data of the remaining image data.

In other words, the overlap processor can reduce the maximum image data capacity to be held whether Dx=2 and Dy=2 or Dx=6 and Dy=6.

It is, however, impossible that Dx represents the number of pixels larger than the difference of (the horizontal width of the input unit area)–(the horizontal displacement between the overlap processing unit area and the frequency converting unit area). It is also impossible that Dy represents the number of pixels larger than the difference of (the vertical width of the input unit area)–(the vertical displacement between the overlap processing unit area and the frequency converting unit area). The overlap processor cannot perform overlap processing on such a Dx×Dy image area.

Sixth Embodiment

The sixth embodiment is described as follows. The encoder according to the sixth embodiment is achieved by generating the encoder 1 according to the third embodiment. More specifically, overlap processing is performed on two consecutive ones of the hierarchical layers of the encoder according to the sixth embodiment. Therefore, the overall processing flow on two consecutive hierarchical layers is described as follows with reference to FIG. 11.

The processing flow on two consecutive hierarchical layers is identical to that in the fifth embodiment except that Dx and Dy on the higher of the two consecutive hierarchical layers are set differently from in the fifth embodiment. Therefore, the following description is focused on how to set Dx and Dy on the higher hierarchical layer.

Dx is set to DxT on the higher hierarchical layer and DxB on the lower hierarchical layer. The frequency converting unit area on the higher hierarchical layer is set to have a horizontal width of xT. The horizontal displacement between the overlap processing unit area and the frequency converting unit area on the higher hierarchical layer is set to dxT. The input unit area on the higher hierarchical layer is set to have a horizontal width of XT.

Dy is set to DyT on the higher hierarchical layer and DyB on the lower hierarchical layer. The frequency converting unit area on the higher hierarchical layer is set to have a vertical width of yT. The vertical displacement between the overlap processing unit area and the frequency converting unit area on the higher hierarchical layer is set to dyT. The input unit area on the higher hierarchical layer is set to have a vertical width of YT.

In order to allow the DC components of DxB×DyB on the higher hierarchical layer to be inputted on the lower hierarchical layer, the frequency conversion section on the higher hierarchical layer is required to frequency-convert a (DxB×xT)×(DyB×yT) image area. Hence, the overlap processor on the higher hierarchical layer is required to perform overlap processing on at least a (DxB×xT+dxT)×(DyB×yT+dyT) image area.

Thus, DxT needs to be set to DxB×xT+dxT or more, and DyT needs to be set to DyB×yT+dyT or more. However, as described in the fifth embodiment, DxT can be XT−dxT or less, and DyT can be YT−dyT or less.

The encoder according to the sixth embodiment is achieved by generating the encoder 1 according to the third embodiment. More specifically, in the encoder 1 according to the second embodiment, DxT=10, DxB=2, xT=4, dxT=2, XT=16, DyT=10, DyB=2, yT=4, dyT=2, and YT=16. In other words, DxT is the minimum number of pixels out of the number of pixels that can be set in the horizontal direction, and DyT is the minimum number of pixels out of the number of pixels that can be set in the vertical direction.

It is preferable that the AC components on the higher and lower hierarchical layers should be outputted concurrently therefrom to the compressor. To achieve this, it is preferable that the frequency conversion section on the higher hierarchical layer should hold the AC components on its own hierarchical layer until the frequency conversion section on the lower hierarchical layer outputs the AC components on its own hierarchical layer to the compressor. Here, when the lower hierarchical layer is the lowest hierarchical layer, it is necessary to consider the timing to output the DC components on the lower hierarchical layer therefrom to the compressor.

Seventh Embodiment

Figure 12:
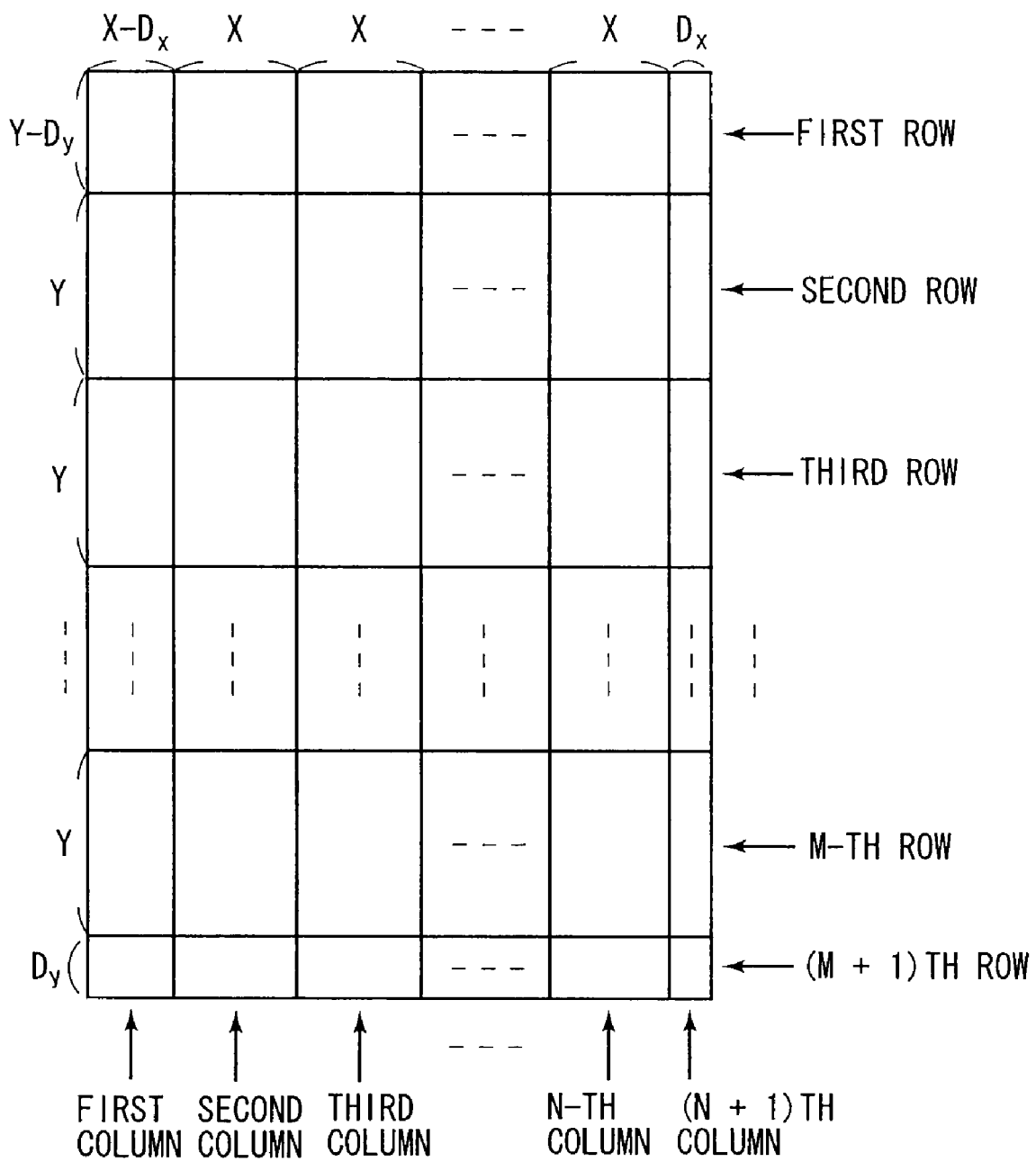
FIG. 12 shows the decoding process according to the seventh and eighth embodiments.

The seventh embodiment is described as follows. The decoder according to the seventh embodiment is achieved by generating the decoder 2 according to the second embodiment. More specifically, overlap inverse processing is not performed on two consecutive ones of the hierarchical layers of the decoder according to the seventh embodiment. Therefore, the overall processing flow on a single hierarchical layer is described as follows with reference to FIG. 12.

The frequency-inverted image which is outputted from a single hierarchical layer has N image areas of X×Y in the horizontal direction and M image areas of X×Y in the vertical direction. The output image adjuster outputs a frequency-inverted image using an X×Y image area as an output unit area, but does not input the output unit area intact from the overlap inverse processor.

The overlap inverse processor inputs a frequency inverting unit area, which has been frequency-inverted, from the frequency inversion section. The overlap inverse processor then selects from the frequency inverting unit area an overlap inverse processing area which can be subjected to overlap inverse processing and which can be fitted into the output unit area. How the overlap inverse processor selects the overlap inverse processing area is described as follows with reference to FIG. 12.

The overlap inverse processor selects, as overlap inverse processing areas to be arranged in the first row, a (X−Dx)×(Y−Dy) image area for the first column, a Dx×(Y−Dy) image area for the (N+1)th column, and an X×(Y−Dy) image area for the other columns.

The overlap inverse processor selects, as overlap inverse processing areas to be arranged in the second to M-th rows, a (X−Dx)×Y image area for the first column, a DX×Y image area for the (N+1)th column, and an X×Y image area for the other columns.

The overlap inverse processor selects, as overlap inverse processing areas to be arranged in the (M+1)th row, a (X−Dx)×Dy image area for the first column, a Dx×Dy image area for the (N+1)th column, and an X×Dy image area for the other columns.

The overlap inverse processor selects, as an overlap inverse processing area to be arranged in the (N+1)th column of a certain row, an image area having a horizontal width of Dx. The overlap inverse processor selects, as an overlap inverse processing area to be arranged in the first column of the next row, an image area having a horizontal width of X−Dx. The output image adjuster then fits these overlap inverse processing areas into an output unit area, and outputs the output unit area outside the single hierarchical layer.

Figure 15:
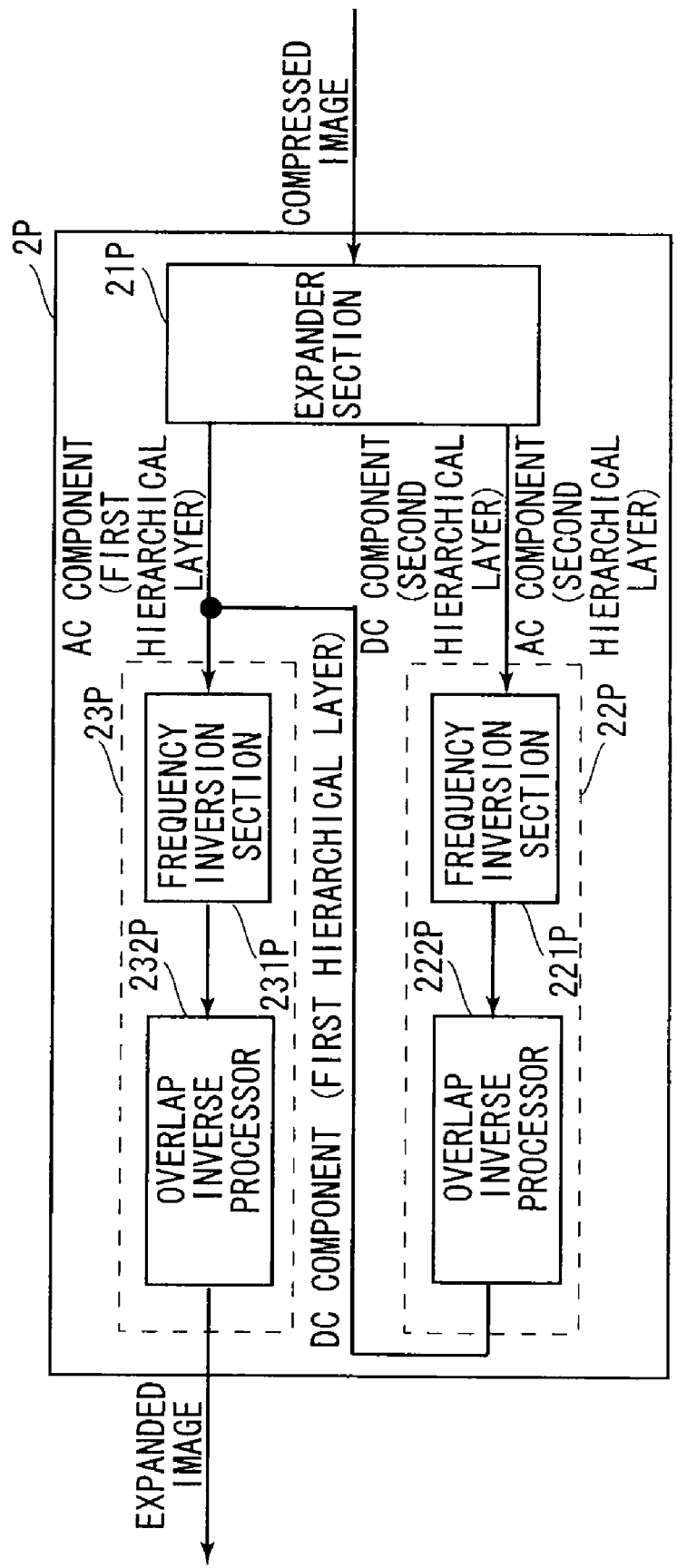
FIG. 15 is a block diagram of the decoder according to the background art.
Figure 17A:
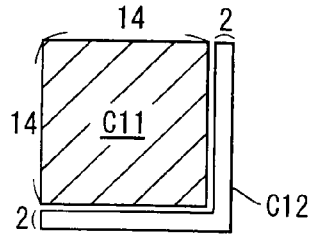
FIGS. 17A to 17F show the encoding and decoding processes according to the background art.
Figure 17B:
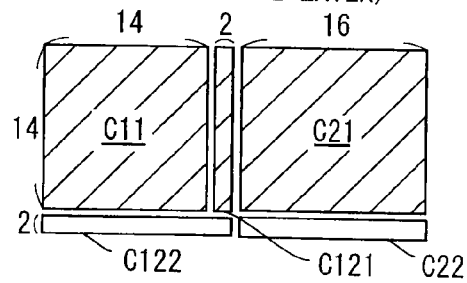
Figure 17C:
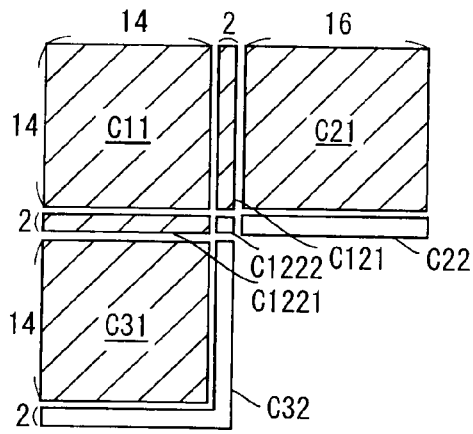
Figure 17D:
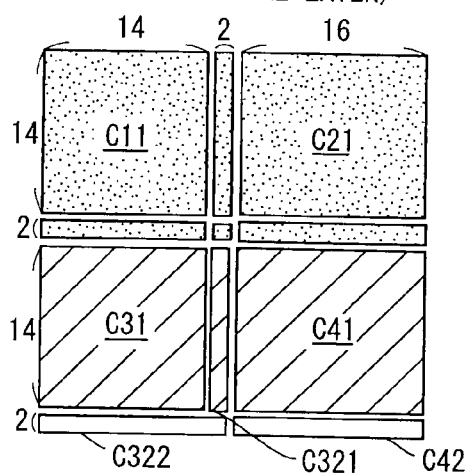
Figure 17E:
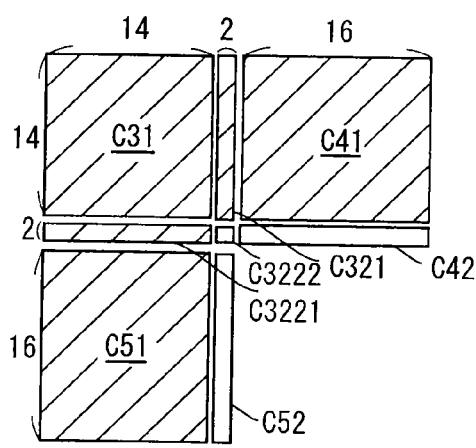
Figure 17F:
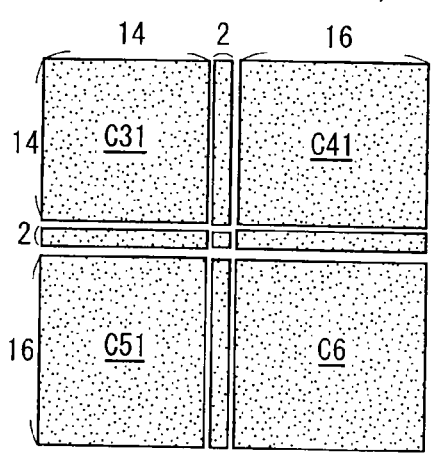

The number of columns in which to arrange the overlap inverse processing areas is larger by one than the number of columns in which to arrange the overlap inverse processing areas in the decoder 2P shown in FIG. 15 (see FIGS. 17A to 17F). The number of rows in which to arrange the overlap inverse processing areas is larger by one than the number of rows in which to arrange the overlap inverse processing areas in the decoder 2P shown in FIG. 15 (see FIGS. 17A to 17F).

However, the output image adjuster can fit the overlap inverse processing area to be arranged in the (N+1)th column of the certain row and the overlap inverse processing area to be arranged in the first column of the next row into an output unit area, and outputs the output unit area outside the single hierarchical layer. In addition, as described from now on, the overlap inverse processor can reduce the maximum image data capacity to be held. Therefore, the decoder according to the seventh embodiment maximizes the advantage of the high performance achieved by hardware implementation.

The output image adjuster inputs overlap inverse processing areas from the overlap inverse processor, fits them into an output unit area, and outputs the output unit area outside the single hierarchical layer. The overlap inverse processor does not perform overlap inverse processing on the image areas other than the overlap inverse processing area of the frequency inverting unit area, which has been frequency-inverted, and holds the image data.

The maximum image area of the image areas other than the overlap inverse processing area has first and second linear areas. The first linear area has a horizontal width of Dx and a vertical width which is equal to the vertical width of the output unit area. The second linear area has a vertical width of Dy and a horizontal width which is equal to the horizontal width of the frequency-inverted image. The second linear area can be either a single consecutive linear area as shown in FIG. 5D or two separate linear areas as shown in FIG. 5C.

Thus, the overlap inverse processor can reduce the maximum image data capacity to be held. As a result, the decoder according to the seventh embodiment maximizes the advantage of the high performance achieved by hardware implementation.

The decoder according to the seventh embodiment is achieved by generating the decoder 2 according to the second embodiment. More specifically, in the decoder 2 according to the second embodiment, Dx=2, Dy=2, X=16, Y=16, N=2, and M=3. In other words, Dx and Dy represent the horizontal displacement and the vertical displacement, respectively, between the overlap inverse processing unit area and the frequency inverting unit area.

Alternatively, Dx may represent the number of pixels other than the horizontal displacement between the overlap inverse processing unit area and the frequency inverting unit area. Similarly, Dy may represent the number of pixels other than the vertical displacement between the overlap inverse processing unit area and the frequency inverting unit area. In the decoder 2 according to the second embodiment, it is alternatively possible that Dx=6 and Dy=6.

It is, however, impossible that Dx represents the number of pixels larger than the difference of (the horizontal width of the output unit area)−(the horizontal displacement between the overlap inverse processing unit area and the frequency inverting unit area). It is also impossible that Dy represents the number of pixels larger than the difference of (the vertical width of the output unit area)−(the vertical displacement between the overlap inverse processing unit area and the frequency inverting unit area). The overlap processor cannot perform overlap inverse processing on such a (X−Dx)×(Y−Dy) image area.

The overlap inverse processor can minimize the maximum image data capacity to be held when Dx is set to the horizontal displacement between the overlap inverse processing unit area and the frequency inverting unit area and Dy is set to the vertical displacement between the overlap inverse processing unit area and the frequency inverting unit area.

Eighth Embodiment

The eighth embodiment is described as follows. The decoder according to the eighth embodiment is achieved by generating the decoder 2 according to the fourth embodiment. More specifically, overlap inverse processing is performed on two consecutive ones of the hierarchical layers of the decoder according to the eighth embodiment. Therefore, the overall processing flow on two consecutive hierarchical layers is described as follows with reference to FIG. 12.

The processing flow on two consecutive hierarchical layers is identical to that in the seventh embodiment except that X−Dx and Y−Dy on the higher hierarchical layer are set differently from in the seventh embodiment. Therefore, the following description is focused on how to set X−Dx and Y−Dy on the higher hierarchical layer.

Dx is set to DxT on the higher hierarchical layer and DxB on the lower hierarchical layer. The frequency inverting unit area on the higher hierarchical layer is set to have a horizontal width of xT. The horizontal displacement between the overlap inverse processing unit area and the frequency inverting unit area on the higher hierarchical layer is set to dxT. The output unit area on the higher hierarchical layer is set to have a horizontal width of XT. The output unit area on the lower hierarchical layer is set to have a horizontal width of XB.

Dy is set to DyT on the higher hierarchical layer and DyB on the lower hierarchical layer. The frequency inverting unit area on the higher hierarchical layer is set to have a vertical width of yT. The vertical displacement between the overlap inverse processing unit area and the frequency inverting unit area on the higher hierarchical layer is set to dyT. The output unit area on the higher hierarchical layer is set to have a vertical width of YT. The output unit area on the lower hierarchical layer is set to have a vertical width of YB.

When the DC components of (XB−DxB)×(YB−DyB) on the higher hierarchical layer are outputted from the lower hierarchical layer, the frequency inversion section on the higher hierarchical layer performs frequency inversion on a ((XB−DxB)×xT)×((YB−DyB)×yT) image area. Hence, the overlap inverse processor on the higher hierarchical layer performs overlap inverse processing on up to a ((XB−DxB)×xT−dxT)×((YB−DyB)×yT−dyT) image area.

Thus, XT−DxT is set to (XB−DxB)×xT−dxT or less, and YT−DyT is set to (YB−DyB)×yT−dyT or less. However, as described in the seventh embodiment, XT−DxT may be set to dxT or more, and YT−DyT may be set to dyT or more.

The encoder according to the eighth embodiment is achieved by generating the decoder 2 according to the fourth embodiment. In the decoder 2 according to the fourth embodiment, DxT=0, DxB=2, xT=4, dxT=2, XT=16, XB=4, DyT=10, DyB=2, yT=4, dyT=2, YT=16, YB=4. In other words, XT−DxT is the maximum number of pixels out of the number of pixels that can be set in the horizontal direction, and YT−DyT is the maximum number of pixels out of the number of pixels that can be set in the vertical direction.

It is preferable that the DC and AC components on the higher hierarchical layer should be concurrently frequency-inverted on its own hierarchical layer. To achieve this, it is preferable that the frequency inversion section on the higher hierarchical layer should hold the AC components on its own hierarchical layer until the output image adjuster on the lower hierarchical layer outputs the DC components on the higher hierarchical layer to the frequency inversion section on the higher hierarchical layer.

While the invention has been shown and described in detail, the foregoing description is in all aspects illustrative and not restrictive. It is therefore understood that numerous modifications and variations can be devised without departing from the scope of the invention.

What is claimed is:

1. A frequency converter for inputting a frequency-unconverted image and outputting a frequency-converted image, said frequency converter comprising:
    an input image adjuster configured to input an input unit area of said frequency converter from outside said frequency converter;
    an overlap processor configured to perform overlap processing on said frequency-unconverted image at a boundary of a frequency converting unit area; and
    a frequency conversion section configured to perform frequency conversion on said frequency-unconverted image subjected to overlap processing, wherein:
    said input image adjuster includes:
        a processing area selecting element configured to select an overlap processing area from said input unit area,
    said overlap processor includes:
        an overlap element configured to perform overlap processing on said overlap processing area; and
        a holding element configured to hold image data of a remaining processing area which has been subjected to overlap processing but cannot be frequency-converted, and
    said remaining processing area includes:
        a linear area having a predetermined width, said linear area being frequency-converted when overlap processing is performed at a next or subsequent time, wherein:
        a maximum image area of said linear area includes:
        a first linear area whose horizontal width is a first predetermined width that is less than the horizontal width of said input unit area; and
        a second linear area whose vertical width is a second predetermined width that is less than the vertical width of said input unit area.

2. The frequency converter according to claim 1, wherein:
    a vertical width of the first linear area is the vertical width of said input unit area; and
    a horizontal width of the second linear area is the horizontal width of said entire frequency-unconverted image.

3. The frequency converter according to claim 2, wherein:
    said first predetermined width is Dx and said second predetermined width is Dy, where
    when the horizontal width of said input unit area is X;
    Dx is at least dx and at most X−dx and dx is a horizontal displacement between an overlap processing unit area and said frequency converting unit area;
    the vertical width of said input unit area is Y; and
    Dy is at least dy and at most Y−dy and dy is a vertical displacement between said overlap processing unit area and said frequency converting unit area,
    said processing area selecting element sets,
    out of overlap processing areas in one row to be arranged in a horizontal direction,
    a horizontal width of an overlap processing area to be arranged first is Dx;
    a horizontal width of an overlap processing area to be arranged last is X−Dx;
    a horizontal width of overlap processing areas to be arranged other than the first and the last is X, and
    said processing area selecting element further sets,
    out of overlap processing areas in one column to be arranged in a vertical direction,
    a vertical width of an overlap processing area to be arranged first is Dy;
    a vertical width of an overlap processing area to be arranged last is Y−Dy; and
    a vertical width of overlap processing areas to be arranged other than the first and the last is Y.

4. The frequency converter according to claim 3, wherein:
    an overlap processing area to be arranged last in a certain row and an overlap processing area to be arranged first in a next row to the certain row are fitted into an image area having a same size as said input unit area, and then outputted to said overlap processor.

5. A hierarchical encoder comprising:
    the frequency converter according to claim 3 as
    a higher frequency converter on a higher hierarchical layer and a lower frequency converter on a lower hierarchical layer, wherein:
    DxT is at least DxB×xT+dxT and at most XT−dxT, where
    Dx is DxT on said higher hierarchical layer;
    Dx is DxB on said lower hierarchical layer;
    xT is a horizontal width of said frequency converting unit area on said higher hierarchical layer;
    dxT is a horizontal displacement between said overlap processing unit area and said frequency converting unit area on said higher hierarchical layer; and
    XT is a horizontal width of said input unit area on said higher hierarchical layer, and
    DyT is at least DyB×yT+dyT and at most YT−dyT where
    Dy is DyT on said higher hierarchical layer;
    Dy is DyB on said lower hierarchical layer;
    yT is a vertical width of said frequency converting unit area on said higher hierarchical layer;
    dyT is a vertical displacement between said overlap processing unit area and said frequency converting unit area on said higher hierarchical layer; and
    YT is a vertical width of said input unit area on said higher hierarchical layer.

6. The hierarchical encoder according to claim 5, further comprising:
    a compressor for compressing the frequency-converted images on said higher hierarchical layer and on said lower hierarchical layer, wherein:
    said frequency conversion section on said higher hierarchical layer includes:
        an element for holding an AC component on said higher hierarchical layer until said frequency conversion section on said lower hierarchical layer outputs an AC component on said lower hierarchical layer to said compressor.

7. A hierarchical encoder comprising:
    the frequency converter according to claim 4 as
    a higher frequency converter on a higher hierarchical layer and a lower frequency converter on a lower hierarchical layer, wherein:

DxT is at least DxB×xT+dxT and at most XT−dxT, where
Dx is DxT on said higher hierarchical layer;
Dx is DxB on said lower hierarchical layer;
xT is a horizontal width of said frequency converting unit area on said higher hierarchical layer;
dxT is a horizontal displacement between said overlap processing unit area and said frequency converting unit area on said higher hierarchical layer; and
XT is a horizontal width of said input unit area on said higher hierarchical layer, and
DyT is at least DyB×yT+dyT and at most YT−dyT where
Dy is DyT on said higher hierarchical layer;
Dy is DyB on said lower hierarchical layer;
yT is a vertical width of said frequency converting unit area on said higher hierarchical layer;
dyT is a vertical displacement between said overlap processing unit area and said frequency converting unit area on said higher hierarchical layer; and
YT is a vertical width of said input unit area on said higher hierarchical layer.

8. The hierarchical encoder according to claim 7, further comprising:
a compressor for compressing the frequency-converted images on said higher hierarchical layer and on said lower hierarchical layer, wherein:
said frequency conversion section on said higher hierarchical layer includes:
an element for holding an AC component on said higher hierarchical layer until said frequency conversion section on said lower hierarchical layer outputs an AC component on said lower hierarchical layer to said compressor.

9. A frequency inverter for inputting a frequency-uninverted image and outputting a frequency-inverted image, said frequency inverter comprising:
a frequency inversion section configured to perform frequency inversion on said frequency-uninverted image;
an overlap inverse processor configured to perform overlap inverse processing on said frequency-inverted image at a boundary of a frequency inverting unit area; and
an output image adjuster configured to output an output unit area of said frequency inverter outside said frequency inverter, wherein:
said overlap inverse processor includes:
an inverse processing area selecting element configured to select an overlap inverse processing area capable of being subjected to overlap inverse processing and being fitted into said output unit area;
an overlap element configured to perform overlap inverse processing on said overlap inverse processing area; and
a holding element configured to hold image data of a remaining inverse processing area other than said overlap inverse processing area, and
said output image adjuster includes:
a fitting element for fitting configured to fit said overlap inverse processing area into said output unit area, and
said remaining inverse processing area includes:
a linear area having a predetermined width, said linear area being subjected to overlap inverse processing at a next or subsequent time wherein:
a maximum image area of said linear area includes:
a first linear area whose horizontal width is a first predetermined width that is less than the horizontal width of said output unit area; and
a second linear area whose vertical width is a second predetermined width that is less than the vertical width of said output unit area.

10. The frequency inverter according to claim 9, wherein:
a vertical width of the first linear area is the vertical width of said output unit area; and
a horizontal width of the second linear area is the horizontal width of said entire frequency-uninnverted image.

11. The frequency inverter according to claim 10, wherein:
said first predetermined width is Dx and said second predetermined width is Dy, where
when the horizontal width of said output unit area is X;
Dx is at least dx and at most X−dx and dx is a horizontal displacement between an overlap inverse processing unit area and said frequency inverting unit area;
the vertical width of said output unit area is Y; and
Dy which is at least dy and at most Y−dy and dy is a vertical displacement between said overlap inverse processing unit area and said frequency inverting unit area,
said inverse processing area selecting element sets,
out of overlap inverse processing areas in one row to be arranged in a horizontal direction,
a horizontal width of an overlap inverse processing area to be arranged first is X−Dx;
a horizontal width of an overlap inverse processing area to be arranged last is Dx; and
a horizontal width of overlap inverse processing areas to be arranged other than the first and the last is X, and
said inverse processing area selecting element further sets,
out of overlap inverse processing areas in one column to be arranged in a vertical direction,
a vertical width of an overlap inverse processing area to be arranged first is Y−Dy;
a vertical width of an overlap inverse processing area to be arranged last is Dy; and
a vertical width of overlap inverse processing areas to be arranged other than the first and the last is Y.

12. The frequency inverter according to claim 11, wherein:
an overlap inverse processing area to be arranged last in a certain row and an overlap inverse processing area to be arranged first in a next row to the certain row are fitted into said output unit area and then outputted outside said frequency inverter.

13. A hierarchical decoder comprising:
the frequency inverter according to claim 11 as
a higher frequency inverter on a higher hierarchical layer and a lower frequency inverter on a lower hierarchical layer, wherein:
(XT−DxT) is at least dxT and at most (XB−DxB)×xT−dxT, where
Dx is DxT on said higher hierarchical layer;
Dx is DxB on said lower hierarchical layer;
xT is a horizontal width of said frequency inverting unit area on said higher hierarchical layer;
dxT is a horizontal displacement between said overlap inverse processing unit area and said frequency inverting unit area on said higher hierarchical layer;
XT is a horizontal width of said output unit area on said higher hierarchical layer; and
XB is a horizontal width of said output unit area on said lower hierarchical layer, and
(YT−DyT) is at least dyT and at most (YB−DyB)×yT−dyT where
Dy is DyT on said higher hierarchical layer;
Dy is DyB on said lower hierarchical layer;
yT is a vertical width of said frequency inverting unit area on said higher hierarchical layer;
dyT is a vertical displacement between said overlap inverse processing unit area and said frequency inverting unit area on said higher hierarchical layer;
YT is a vertical width of said output unit area on said higher hierarchical layer; and YB is a vertical width of said output unit area on said lower hierarchical layer.

14. The hierarchical decoder according to claim 13, further comprising:
an expansion section for expanding the frequency-uninverted images on said higher hierarchical layer and said lower hierarchical layer, wherein:
said frequency inversion section on said higher hierarchical layer includes:
an element for holding an AC component on said higher hierarchical layer until said output image adjuster on said lower hierarchical layer outputs a DC component on said higher hierarchical layer to said frequency inversion section on said higher hierarchical layer.

15. A hierarchical decoder comprising:
the frequency inverter according to claim 12 as
a higher frequency inverter on a higher hierarchical layer and a lower frequency inverter on a lower hierarchical layer, wherein:
(XT−DxT) is at least dxT and at most (XB−DxB)×xT−dxT, where
Dx is DxT on said higher hierarchical layer;
Dx is DxB on said lower hierarchical layer;
xT is a horizontal width of said frequency inverting unit area on said higher hierarchical layer;
dxT is a horizontal displacement between said overlap inverse processing unit area and said frequency inverting unit area on said higher hierarchical layer;
XT is a horizontal width of said output unit area on said higher hierarchical layer; and
XB is a horizontal width of said output unit area on said lower hierarchical layer, and
(YT−DyT) is at least dyT and at most (YB−DyB)×yT−dyT where
Dy is DyT on said higher hierarchical layer;
Dy is DyB on said lower hierarchical layer;
yT is a vertical width of said frequency inverting unit area on said higher hierarchical layer;
dyT is a vertical displacement between said overlap inverse processing unit area and said frequency inverting unit area on said higher hierarchical layer;
YT is a vertical width of said output unit area on said higher hierarchical layer; and
YB is a vertical width of said output unit area on said lower hierarchical layer.

16. The hierarchical decoder according to claim 15, further comprising:
an expansion section for expanding the frequency-uninverted images on said higher hierarchical layer and said lower hierarchical layer, wherein:
said frequency inversion section on said higher hierarchical layer includes:
an element for holding an AC component on said higher hierarchical layer until said output image adjuster on said lower hierarchical layer outputs a DC component on said higher hierarchical layer to said frequency inversion section on said higher hierarchical layer.

17. A frequency conversion method for inputting a frequency-unconverted image and outputting a frequency-converted image, said frequency conversion method comprising:
inputting an input unit area of said frequency converter from outside said frequency converter;
performing overlap processing on said frequency-unconverted image at a boundary of a frequency converting unit area; and
performing frequency conversion on said frequency-unconverted image subjected to overlap processing, wherein:
the inputting of an input unit area includes:
selecting an overlap processing area from said input unit area,
the performing of overlap processing includes:
performing overlap processing on said overlap processing area; and
holding image data of a remaining processing area which has been subjected to overlap processing but cannot be frequency-converted,
said remaining processing area including:
a linear area having a predetermined width, said linear area being frequency-converted when overlap processing is performed at a next or subsequent time,
wherein:
a maximum image area of said linear area includes:
a first linear area whose horizontal width is a first predetermined width that is less than the horizontal width of said input unit area; and
a second linear area whose vertical width is a second predetermined width that is less than the vertical width of said input unit area.

* * * * *